United States Patent [19]
Inoshita et al.

[11] Patent Number: 6,091,615
[45] Date of Patent: Jul. 18, 2000

[54] RESONANT POWER CONVERTER

[75] Inventors: Ryosuke Inoshita, Kasugai; Masahito Mizukoshi, Kagoya, both of Japan

[73] Assignee: Denso Corporation, Kariya, Japan

[21] Appl. No.: 09/200,861

[22] Filed: Nov. 27, 1998

[30]     Foreign Application Priority Data

Nov. 28, 1997  [JP]  Japan ..................................... 9-328992
Oct. 19, 1998  [JP]  Japan ................................. 10-297128

[51] Int. Cl.$^7$ ............................ H02M 7/44; H02M 7/521
[52] U.S. Cl. ................................ 363/98; 363/40; 363/132
[58] Field of Search ................................. 363/16, 17, 37, 363/56, 89, 97, 98, 131, 132, 40; 318/798, 806, 811

[56]            References Cited

U.S. PATENT DOCUMENTS

| | | |
|---|---|---|
| 4,730,242 | 3/1988 | Divan . |
| 4,833,584 | 5/1989 | Divan . |
| 4,864,483 | 9/1989 | Divan . |
| 5,047,913 | 9/1991 | De Doncker et al. . |
| 5,172,309 | 12/1992 | De Doncker et al. . |
| 5,280,421 | 1/1994 | Doncker et al. ........................... 363/98 |
| 5,412,557 | 5/1995 | Lauw ......................................... 363/37 |
| 5,450,306 | 9/1995 | Garces et al. .............................. 363/41 |
| 5,491,622 | 2/1996 | Carosa ...................................... 363/56 |
| 5,592,371 | 1/1997 | Rajashekara et al. . |
| 5,594,634 | 1/1997 | Rajashekara et al. . |
| 5,710,698 | 1/1998 | Lai et al. .................................. 363/56 |
| 5,912,813 | 6/1999 | Kerkman et al. .......................... 363/98 |

OTHER PUBLICATIONS

Chen et al: "A Passively Clamped Quasi Resonant DC Link Inverter" IEEE, 1994, pp. 841–848.

*Primary Examiner*—Adolf Deneke Berhane
*Attorney, Agent, or Firm*—Pillsbury Madison & Sutro LLP

[57]             ABSTRACT

A resonant power converter includes a positive bus line (1A) and a negative bus line (1B). A power converting portion (2) connected between a DC power source (1) and a load (5) operates for implementing power conversion. The power converting portion includes a plurality of main switching devices (3a–3f) connected in series and provided between the positive bus line and the negative bus line, and a plurality of flywheel diodes (4a–4f) connected in antiparallel with the main switching devices respectively for each phase. A resonant circuit (8) connected between the positive bus line and the negative bus line includes a resonant capacitor (6) and a resonant reactor (7) connected in series with the resonant capacitor. A control device (13) operates for switching the main switching devices in accordance with a predetermined pattern to enable the power converting portion to implement power conversion. The control device turns on a first switching device among the main switching devices to start resonance to be implemented by the resonant capacitor and the resonant reactor. The control means turns off a second switching device among the main switching devices when a resonant current caused by the resonance is greater than a load current and hence a current flows through one of the flywheel diodes which is connected in antiparallel with the second switching device.

28 Claims, 21 Drawing Sheets

RESONANT POWER CONVERTER

BACKGROUND OF THE INVENTION

1. Field of the Invention

This invention relates to a resonant power converter for implementing power conversion which is generally provided between a DC power supply and an AC-powered load such as an AC motor or an AC rotating machine.

2. Description of the Related Art

In a power converter of an all resonant type, resonance is always implemented by a resonant circuit. Since resonance is always implemented, such a power converter tends to encounter the problem of a great conduction loss caused in a reactor for resonance.

A power converter of a partial resonant type solves the above-indicated problem in the power converter of the all resonant type. In the power converter of the partial resonant type, resonance is implemented only at switching moments.

U.S. Pat. No. 5,047,913 discloses a power converter of the partial resonant type. The power converter in U.S. Pat. No. 5,047,913 has a large number of parts, and thus tends to be complicated in structure.

SUMMARY OF THE INVENTION

It is an object of this invention to provide a resonant power converter having a simple structure.

A first aspect of this invention provides a resonant power converter comprising a positive bus line (1A); a negative bus line (1B); a power converting portion (2) connected between a DC power source (1) and a load (5) for implementing power conversion, the power converting portion including a plurality of main switching devices (3a–3f) connected in series and provided between the positive bus line and the negative bus line, and a plurality of flywheel diodes (4a–4f) connected in antiparallel with the main switching devices respectively for each phase; a resonant circuit (8) connected between the positive bus line and the negative bus line, and including a resonant capacitor (6) and a resonant reactor (7) connected in series with the resonant capacitor; and control means (13) for switching the main switching devices in accordance with a predetermined pattern to enable the power converting portion to implement power conversion; wherein the control means turns on a first switching device among the main switching devices to start resonance to be implemented by the resonant capacitor and the resonant reactor, and the control means turns off a second switching device among the main switching devices when a resonant current caused by the resonance is greater than a load current and hence a current flows through one of the flywheel diodes which is connected in antiparallel with the second switching device.

A second aspect of this invention is based on the first aspect thereof, and provides a resonant power converter wherein the control means comprises first means for detecting whether or not a voltage between the positive bus line and the negative bus line is negative, and second means for turning off the second switching device when the first means detects that the voltage between the positive bus line and the negative bus line is negative.

A third aspect of this invention is based on the first aspect thereof, and provides a resonant power converter wherein the control means comprises first means for detecting whether or not a voltage across the second switching device is negative, and second means for turning off the second switching device when the first means detects that the voltage across the second switching device is negative.

A fourth aspect of this invention is based on the first aspect thereof, and provides a resonant power converter wherein the control means comprises first means for detecting whether or not a current flows through the second switching device, and second means for turning off the second switching device when the first means detects that a current does not flow through the second switching device.

A fifth aspect of this invention is based on the first aspect thereof, and provides a resonant power converter wherein the control means comprises first means for detecting whether or not a current flows through the flywheel diode connected in antiparallel with the second switching device, and second means for turning off the second switching device when the first means detects that a current flows through the flywheel diode connected in antiparallel with the second switching device.

A sixth aspect of this invention is based on the first aspect thereof, and provides a resonant power converter wherein the control means turns off the second switching device when a predetermined time has elapsed since start of the resonance.

A seventh aspect of this invention provides a resonant power converter comprising a positive bus line (1A); a negative bus line (1B); a power converting portion (2) connected between a DC power source (1) and a load (5) for implementing power conversion, the power converting portion including a plurality of main switching devices (3a–3f) connected in series and provided between the positive bus line and the negative bus line, and a plurality of flywheel diodes (4a–4f) connected in antiparallel with the main switching devices respectively for each phase; a resonant circuit (8) connected between the positive bus line and the negative bus line, and including a resonant capacitor (6) and a resonant reactor (7) connected in series with the resonant capacitor; and control means (13) for turning on the main switching devices to start resonance to be implemented by the resonant capacitor and the resonant reactor, and for turning off a switching device among the main switching devices when the resonance causes a voltage between the positive bus line and the negative bus line to become substantially 0 V.

An eighth aspect of this invention is based on the first aspect thereof, and provides a resonant power converter further comprising over-current avoiding means (9) for preventing an over-current from flowing through the main switching devices when the main switching devices are turned on.

A ninth aspect of this invention is based on the eighth aspect thereof, and provides a resonant power converter wherein the over-current avoiding means includes a reactor (9a).

A tenth aspect of this invention is based on the ninth aspect thereof, and provides a resonant power converter wherein the reactor in the over-current avoiding means has a predetermined inductance chosen not to cause resonance in conjunction with the resonant capacitor and the resonant reactor.

An eleventh aspect of this invention is based on the tenth aspect thereof, and provides a resonant power converter wherein the inductance Ld of the reactor in the over-current avoiding means, an inductance Lr of the resonant reactor, and an inductance Lm of the load have a relation as Lm>Ld>Lr.

A twelfth aspect of this invention is based on the ninth aspect thereof, and provides a resonant power converter further comprising a voltage clamp circuit (10) which includes a voltage clamp reactor (10a) coupled with the reactor in the over-current avoiding means for clamping a voltage between the positive bus line and the negative bus line at a predetermined level.

A thirteenth aspect of this invention is based on the twelfth aspect thereof, and provides a resonant power converter wherein the voltage clamp circuit returns power to the DC power source by a current flowing through the voltage clamp reactor.

A fourteenth aspect of this invention is based on the thirteenth aspect thereof, and provides a resonant power converter wherein the control means includes first means for detecting whether or not a current flowing through the voltage clamp reactor is zero, second means for detecting whether or not a current flowing through the voltage clamp reactor is minimum, and third means for starting the resonance when the first means detects that a current flowing through the voltage clamp reactor is zero or the second means detects that a current flowing through the voltage clamp reactor is minimum.

A fifteenth aspect of this invention is based on the eighth aspect thereof, and provides a resonant power converter wherein the over-current avoiding means includes switching means (9b) for disconnecting the power converting portion from the DC power source during a time interval from a moment before start of the resonance to a moment at which the second switching device among the main switching devices is turned off.

A sixteenth aspect of this invention is based on the fifteenth aspect thereof, and provides a resonant power converter wherein the switching means is able to conduct a current in two ways.

A seventeenth aspect of this invention is based on the first aspect thereof, and provides a resonant power converter further comprising a voltage clamp circuit (10) for clamping a voltage between the positive bus line and the negative bus line at a predetermined level.

An eighteenth aspect of this invention is based on the seventeenth aspect thereof, and provides a resonant power converter wherein the voltage clamp circuit includes a diode (10c) which has an anode connected to the power converting portion and a cathode connected to the DC power source.

A nineteenth aspect of this invention is based on the seventeenth aspect thereof, and provides a resonant power converter wherein the voltage clamp circuit includes a DC voltage source (10d) connected in series with the DC power source, and a diode (10e) which has an anode connected to the power converting portion and a cathode connected to the DC voltage source.

A twentieth aspect of this invention is based on the seventeenth aspect thereof, and provides a resonant power converter wherein the voltage clamp circuit includes a capacitor (10f) connected in series with the DC power source, a diode (10g) which has an anode connected to the power converting portion and a cathode connected to the capacitor, and switching means for charging and discharging the capacitor during clamp.

A twenty-first aspect of this invention provides a resonant power converter comprising a power converting portion (2) including main switching devices (3a–3f) for a plurality of phases, the power converting portion having an upper arm and a lower arm; a resonant circuit (8) connected to the power converting portion, and including a resonant capacitor (6) and a resonant reactor (7) connected to the resonant capacitor; means for short-circuiting the upper arm and the lower arm to each other to enable resonance to be caused by the resonant circuit; and means for switching the main switching devices to implement commutation during a presence of the resonance.

A twenty-second aspect of this invention provides a resonant power converter comprising a power converting portion (2) including upper and lower arms, main switching devices (3a–3f) in the upper and lower arms respectively, and flywheel diodes (4a–4f) connected in antiparallel with the main switching devices respectively; a resonant circuit (8) connected to the power converting portion, and including a resonant capacitor (6) and a resonant reactor (7) connected in series with the resonant capacitor; and control means (13) for short-circuiting the upper and lower arms to each other to enable resonance to be caused by the resonant circuit, and for switching a designated switching device among the main switching devices when the resonance causes a current to flow through one of the flywheel diodes which is connected in antiparallel with the designated switching device.

A twenty-third aspect of this invention is based on the twenty-second aspect thereof, and provides a resonant power converter wherein the control means includes timing detection means (161) for detecting desired timings at which the main switching devices are switched, and means (162) for short-circuiting the upper and lower arms to each other at timings equal to the detected desired timings.

A twenty-fourth aspect of this invention is based on the twenty-second aspect thereof, and provides a resonant power converter wherein the control means includes means for turning on all the main switching devices to implement short-circuiting the upper and lower arms to each other.

A twenty-fifth aspect of this invention is based on the twenty-first aspect thereof, and provides a resonant power converter further comprising short-circuit avoiding means (9) for preventing a short-circuit between the DC power source and the power converting portion during switching of the main switching devices.

DESCRIPTION OF THE PREFERRED EMBODIMENTS

A prior-art resonant power converter will be explained below for a better understanding of this invention.

Figure 1:
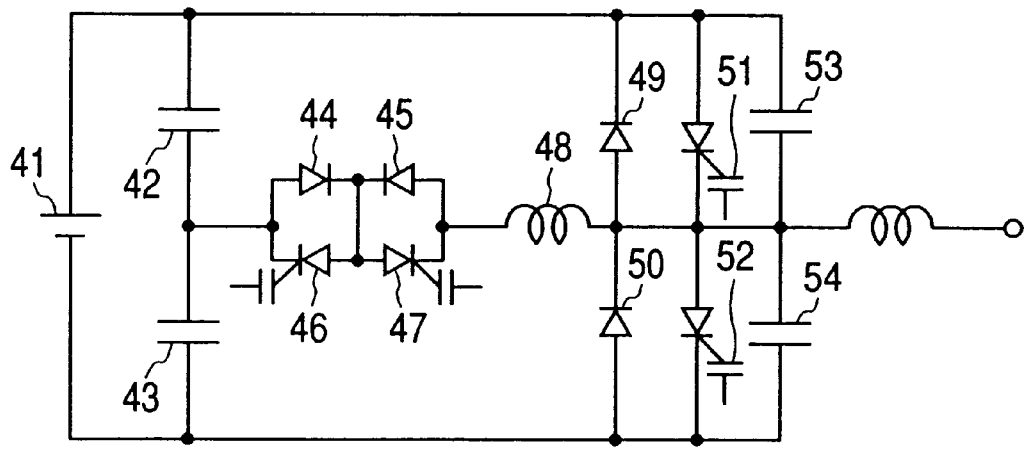
FIG. 1 is a schematic diagram of a prior-art resonant power converter.

FIG. 1 shows a 1-phase-corresponding portion of a prior-art three-phase resonant power converter disclosed in U.S. Pat. No. 5,047,913. The prior-art converter in FIG. 1 includes a first circuit having a series combination of voltage dividing capacitors 42 and 43, a second circuit having a series combination of flywheel diodes 49 and 50, a third circuit having a series combination of main switching devices 51 and 52, and a fourth circuit having a series combination of resonant capacitors (snubber capacitors) 53 and 54. The first, second, third, and fourth circuits are connected in parallel with a DC voltage source 41.

In addition, the prior-art converter of FIG. 1 includes an auxiliary resonant commutation circuit having a combination of auxiliary switching devices 46 and 47, flywheel diodes 44 and 45, and a resonant reactor (a resonant inductor) 48. One end of the auxiliary resonant commutation circuit is connected to the junction between the voltage dividing capacitors 42 and 43. The other end of the auxiliary resonant commutation circuit is connected to the junction between the flywheel diodes 49 and 50, the junction between the main switching devices 51 and 52, and the junction between the resonant capacitors 53 and 54.

The prior-art converter of FIG. 1 operates as follows. In the case where the main switching device 51 is required to change from its on state to its off state, the auxiliary switching device 46 is turned on so that resonance is caused by the resonant inductor 48 and the resonant capacitor 53. When the voltage across the main switching device 51 reaches zero, the switching of the main switching device 51 is executed. Accordingly, there is substantially no turn-off switching loss caused by the main switching device 51.

In the case where the main switching device 52 is required to change from its on state to its off state, the auxiliary switching device 47 is turned on so that resonance is caused by the resonant inductor 48 and the resonant capacitor 54. When the voltage across the main switching device 52 reaches zero, the switching of the main switching device 52 is executed. Accordingly, there is substantially no turn-off switching loss caused by the main switching device 52.

The prior-art converter has three 1-phase-corresponding portions similar to each other. The DC voltage source 41 and the voltage dividing capacitors 42 and 43 are common to the three 1-phase-corresponding portions. Thus, the whole of the prior-art converter has two voltage dividing capacitors, three reactors, six resonant capacitors, six main switching devices, six auxiliary switching devices, and twelve flywheel diodes. Accordingly, the prior-art converter is composed of many parts. In addition, the prior-art converter has a complicated structure.

First Embodiment

Figure 2:
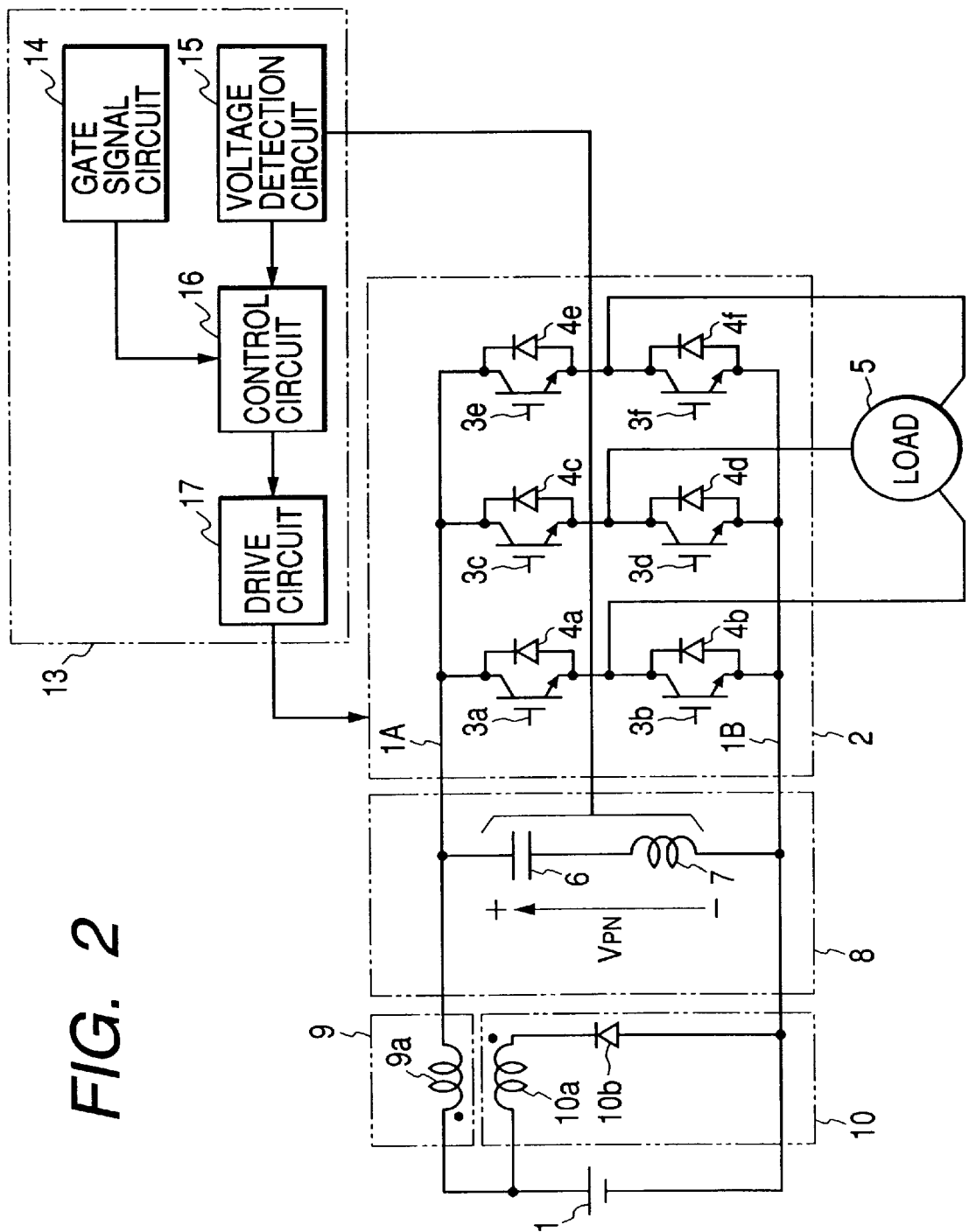
FIG. 2 is a diagram of a resonant power converter according to a first embodiment of this invention.

FIG. 2 shows a resonant power converter according to a first embodiment of this invention. With reference to FIG. 2, the resonant power converter is connected between a DC power source (a DC voltage source) 1 and a three-phase AC-powered load 5. Here, "DC" is short for "direct current", and "AC" is short for "alternating current". An example of the load 5 is a three-phase AC motor. The resonant power converter receives DC power from the DC power source 1, and converts the received DC power into AC power and feeds the AC power to the load 5 to drive the load 5.

With reference to FIG. 2, the resonant power converter includes a power converting portion 2 having main switching devices 3a, 3b, 3c, 3d, 3e, and 3f. Preferably, the main switching devices 3a–3f are of a self-arc-extinguishing type. The main switching devices 3a–3f include, for example, insulated gate bipolar transistors (IGBT's). The main switching devices 3a–3f are connected to form a bridge circuit. The bridge circuit is connected between a positive bus line 1A and a negative bus line 1B which lead from the positive terminal and the negative terminal of the DC power source 1 respectively. The bridge circuit has three portions corresponding to three phases respectively. The three phases are also referred to as the U phase, the V phase, and the W phase. The first portion of the bridge circuit includes the main switching devices 3a and 3b which are connected in series. The main switching devices 3a and 3b relate to the U phase. The series combination of the main switching devices 3a and 3b is connected between the positive bus line 1A and the negative bus line 1B. The second portion of the bridge circuit includes the main switching devices 3c and 3d which are connected in series. The main switching devices 3c and 3d relate to the V phase. The series combination of the main switching devices 3c and 3d is connected between the positive bus line 1A and the negative bus line 1B. The third portion of the bridge circuit includes the main switching devices 3e and 3f which are connected in series. The main switching devices 3e and 3f relate to the W phase. The series combination of the main switching devices 3e and 3f is connected between the positive bus line 1A and the negative bus line 1B.

The power converting portion 2 includes flywheel diodes 4a, 4b, 4c, 4d, 4e, and 4f which are connected in antiparallel with the main switching devices 3a, 3b, 3c, 3d, 3e, and 3f respectively. The combination of the main switching device 3a and the flywheel diode 4a forms a bridge arm connected to the positive bus line 1A. The combination of the main switching device 3b and the flywheel diode 4b forms a bridge arm connected to the negative bus line 1B. The combination of the main switching device 3c and the flywheel diode 4c forms a bridge arm connected to the positive bus line 1A. The combination of the main switching device 3d and the flywheel diode 4d forms a bridge arm connected to the negative bus line 1B. The combination of the main switching device 3e and the flywheel diode 4e forms a bridge arm connected to the positive bus line 1A. The combination of the main switching device 3f and the flywheel diode 4f forms a bridge arm connected to the negative bus line 1B. The bridge arms connected to the positive bus line 1A are referred to as the upper bridge arms or the upper arms. The bridge arms connected to the negative bus line 1B are referred to as the lower bridge arms or the lower arms.

The power converting portion 2 is connected to a control portion 13. The power converting portion 2 is controlled by the control portion 13. Specifically, the pair of the main switching devices 3a and 3b, the pair of the main switching devices 3c and 3d, and the pair of the main switching devices 3e and 3f are subjected by the control portion 13 to respective on/off control processes (switching processes) having 120° phase differences relative to each other. Thus, the control portion 13 switches the main switching devices 3a–3f in accordance with a predetermined switching pattern to enable the power converting portion 2 to implement desired power conversion.

The power converting portion 2 is connected to the load 5. Specifically, the junction between the main switching devices 3a and 3b in the power converting portion 2 is connected to a first terminal of the load 5 which corresponds to the U phase. The junction between the main switching devices 3c and 3d in the power converting portion 2 is connected to a second terminal of the load 5 which corresponds to the V phase. The junction between the main switching devices 3e and 3f in the power converting portion 2 is connected to a third terminal of the load 5 which corresponds to the W phase. The power converting portion 2 generates a three-phase AC voltage, and applies the generated three-phase AC voltage to the first, second, and third terminals of the load 5.

A resonant capacitor 6 and a resonant reactor (a resonant inductor) 7 are connected in series. The series combination of the resonant capacitor 6 and the resonant reactor 7 is connected between the positive bus line 1A and the negative bus line 1B. The resonant capacitor 6 and the resonant reactor 7 compose a resonant circuit 8 connected to the power converting portion 2. As will be explained later, the resonant capacitor 6 and the resonant reactor 7 implement resonance when both the main switching devices in a pair in the power converting portion 2 turn on to form a path along which a resonant current can flow. The resonant capacitor 6 has a predetermined capacitance. The resonant reactor 7 has a predetermined inductance. Preferably, the inductance of the resonant reactor 7 is smaller than that of the load 5. The inductance of the resonant reactor 7 may be greater than that of the load 5.

A short-circuit avoiding device 9 is interposed in the positive bus line 1A. The short-circuit avoiding device 9 is connected between the resonant circuit 8 (or the power converting portion 2) and the positive terminal of the DC power source 1. The short-circuit avoiding device 9 includes a reactor (an inductor) 9a which has a predetermined inductance greater than the inductance of the resonant reactor 7. Preferably, the inductance of the reactor 9a is smaller than that of the load 5. The reactor 9a is interposed in the positive bus line 1A extending between the DC power source 1 and the resonant circuit 8 (or the power converting portion 2). When both the main switching devices in a pair in the power converting portion 2 turn on, the short-circuit avoiding device 9 prevents an excessive current or an over-current from flowing through the main switching devices.

A voltage clamp circuit 10 is connected between the positive bus line 1A and the negative bus line 1B. The voltage clamp circuit 10 operates to clamp the voltage between the positive bus line 1A and the negative bus line 1B. The voltage clamp circuit 10 includes a reactor (an inductor) 10a and a diode 10b. One end of the reactor 10a is connected to the positive bus line 1A, that is, the positive terminal of the DC power source 1. The other end of the reactor 10a is connected to the cathode of the diode 10b. The anode of the diode 10b is connected to the negative bus line 1B, that is, the negative terminal of the DC power source 1. The reactor 10a is electromagnetically coupled with the reactor 9a in the short-circuit avoiding circuit 9 on a differential basis. During a clamping process, the voltage clamp circuit 10 returns power to the DC power source 1 when a current flows through the reactor 10a.

Preferably, the reactors 9a and 10a include windings on a common core which correspond to primary and secondary windings of a clamp transformer respectively. The ratio of the number of turns of the winding in the reactor 10a to the number of turns of the winding in the reactor 9a is set to a predetermined value "n". Preferably, the predetermined value "n" is greater than 1.

Figure 3:
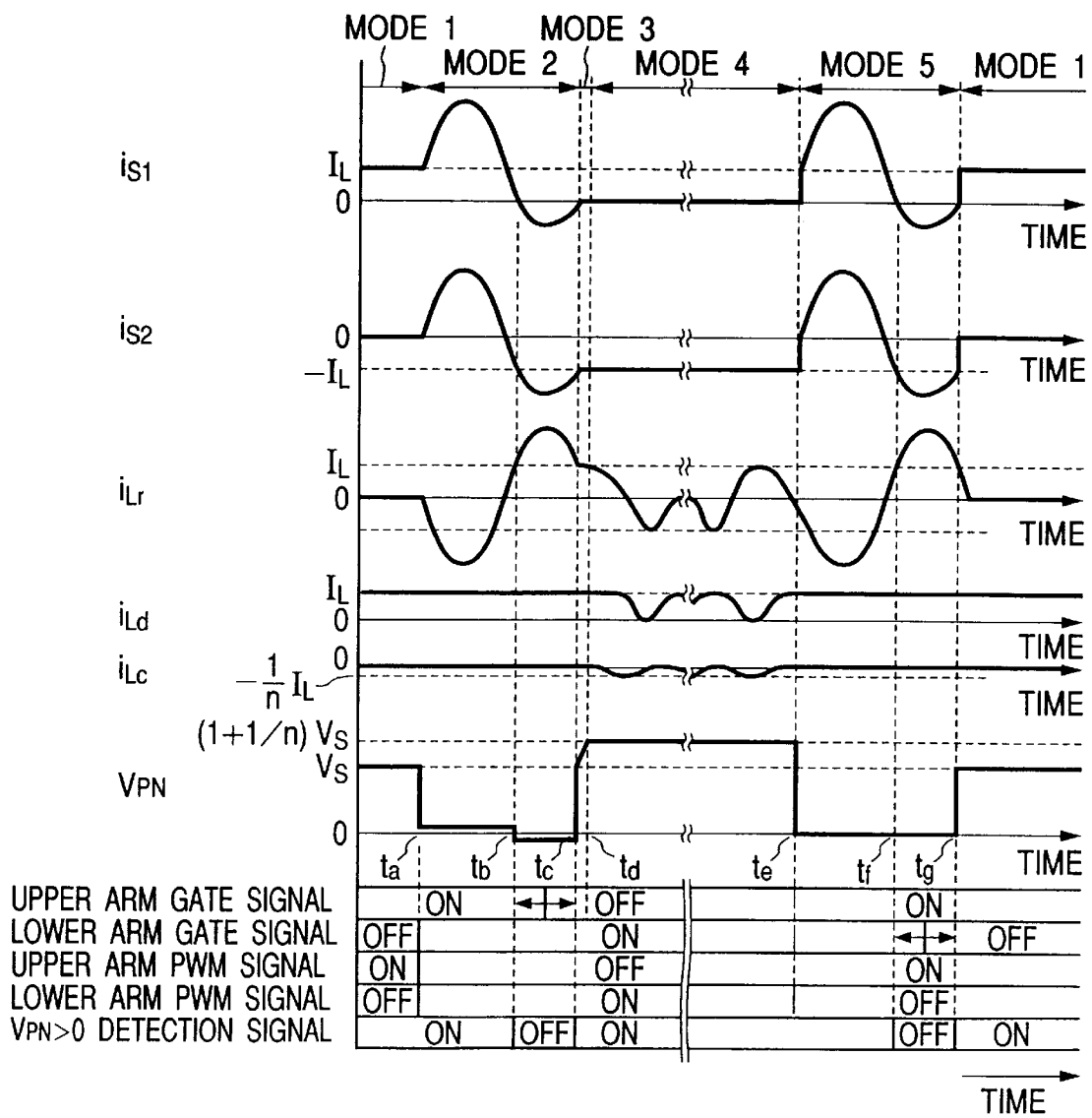
FIG. 3 is a time-domain diagram of currents, signals, and a voltage which occur in the resonant power converter in FIG. 2.

With reference to FIG. 3, "is1" denotes a current flowing through an upper bridge arm in the power converting portion 2, and "is2" denotes a current flowing through a lower bridge arm in the power converting portion 2 which relates to the previously-mentioned upper bridge arm. In addition, "iLr" denotes a current flowing through the resonant reactor 7, and "iLd" denotes a current flowing through the reactor 9a. Furthermore, "iLc" denotes a current flowing through the reactor 10a, and "VPN" denotes a voltage across the series combination of the resonant capacitor 6 and the resonant reactor 7, that is, a voltage between the upper end of the upper bridge arm and the lower end of the lower bridge arm.

The power converting portion 2 operates as follows. It is assumed that the U phase which relates to the main switching devices 3a and 3b will be switched. Before the occurrence of a commutation from the main switching device 3a to the flywheel diode 4b, the main switching device 3a is in its on state so that a current flows toward the load 5 via the main switching device 3a. At a moment "ta" in FIG. 3, the main switching device 3b is turned on so that the positive bus line 1A is short-circuited to the negative bus line 1B via the main switching devices 3a and 3b. In other words, the upper end of the upper bridge arm is short-circuited to the lower end of the lower bridge arm. Accordingly, there occurs a closed-loop resonant path having the resonant capacitor 6, the resonant reactor 7, and the main switching devices 3a and 3b. Thus, at the moment "ta", a resonant current starts to flow in the resonant path. The resonant current and a load current are in the same direction, and the resultant or the superimposition of the resonant current and the load current flows through the main switching device 3a. The resonant current flows through the main switching device 3b. When the upper end of the upper bridge arm is short-circuited to the lower end of the lower bridge arm, the reactor 9a prevents an excessive current or an over-current from flowing through the main switching devices 3a and 3b. Preferably, the inductance of the reactor 9a is set significantly greater than the inductance of the resonant reactor 7 to prevent the reactor 9a from interfering with the resonance by the resonant capacitor 6 and the resonant reactor 7. For example, the inductance of the reactor 9a is greater than the inductance of the resonant reactor 7 by two orders. Then, the resonant current reverses, and the absolute value of the resonant current is greater than that of the load current during the time interval between moments "tb" and "tc" in FIG. 3. The moment "tb" follows the moment "ta". During the time interval between the moments "tb" and "tc", a current flows through the flywheel diodes 4a and 4b so that the voltage between the collector and the emitter of each of the main switching devices 3a and 3b is negative. The main switching device 3a is turned off during the time interval between the moments "tb" and "tc. Thus, regarding the main switching device 3a, zero-voltage switching is implemented, and there occurs substantially no turn-off switching loss.

The absolute value of the resonant current decreases, and the current flow through the flywheel diode 4a is blocked and the flywheel diode 4a falls into its off state at the moment "tc". Thus, the load current starts to flow through the flywheel diode 4b at the moment "tc". Since a current equivalent to the current through the flywheel diode 4b flows via the resonant capacitor 6 and the resonant reactor 7, the resonant capacitor 6 is charged and the voltage VPN across the series combination of the resonant capacitor 6 and the resonant reactor 7 rises. At a moment "td" following the moment "tc" in FIG. 3, the voltage VPN reaches a predetermined upper limit equal to "1+1/n" times the voltage generated by the DC power source 1, where "n" denotes the ratio of the number of turns of the winding in the reactor 10a to the number of turns of the winding in the reactor 9a. After the moment "td", the voltage VPN is clamped to the upper limit. A current starts to flow through the voltage clamp circuit 10, and power is returned from the voltage clamp circuit 10 to the DC power source 1. The current "iLd" through the reactor 9a and the current "iLc" through the reactor 10a hardly vary in a switching period.

A commutation from the flywheel diode 4b to the main switching device 3a will be explained. At a moment "te" following the moment "td" in FIG. 3, the main switching device 3a is turned on so that the positive bus line 1A is short-circuited to the negative bus line 1B via the main switching devices 3a and 3b. In other words, the upper end of the upper bridge arm is short-circuited to the lower end of the lower bridge arm. Accordingly, there occurs a closed-loop resonant path having the resonant capacitor 6, the resonant reactor 7, and the main switching devices 3a and 3b. Thus, at the moment "te", a resonant current starts to flow in the resonant path. The resonant current and the load current are in the same direction, and the resultant or the superimposition of the resonant current and the load current flows through the main switching device 3a. The resonant current flows through the main switching device 3b. Then, the resonant current reverses, and the absolute value of the resonant current is greater than that of the load current during the time interval between moments "tf" and "tg" in FIG. 3. The moment "tf" follows the moment "te". During the time interval between the moments "tf" and "tg", a current flows through the flywheel diodes 4a and 4b so that the voltage between the collector and the emitter of each of the main switching devices 3a and 3b is negative. The main switching device 3b is turned off during the time interval between the moments "tf" and "tg. Thus, regarding the main switching device 3b, zero-voltage switching is implemented, and there occurs substantially no turn-off switching loss. The absolute value of the resonant current decreases, and the current flow through the flywheel diode 4a is blocked and the flywheel diode 4a falls into its off state. Subsequently, the current flow through the flywheel diode 4b is blocked and the flywheel diode 4b falls into its off state. As a result, the resonance is terminated, and one cycle of operation of the power converting portion 2 is completed in connection with the U phase. Then, next and later cycles of operation are executed.

Also regarding the V phase and the W phase, similar communications are implemented while zero-voltage switching is performed.

With reference back to FIG. 2, the control portion 13 operates to control the main switching devices 3a–3f. The control portion 13 includes a gate signal generation circuit 14, a voltage detection circuit 15, a control circuit 16, and a drive circuit 17. The gate signal generation circuit 14 is connected to the control circuit 16. The voltage detection circuit 15 is connected to the resonant circuit 8 and the control circuit 16. The control circuit 16 is connected to the drive circuit 17. The drive circuit 17 is connected to the gates of the main switching devices 3a–3f.

Figure 4:
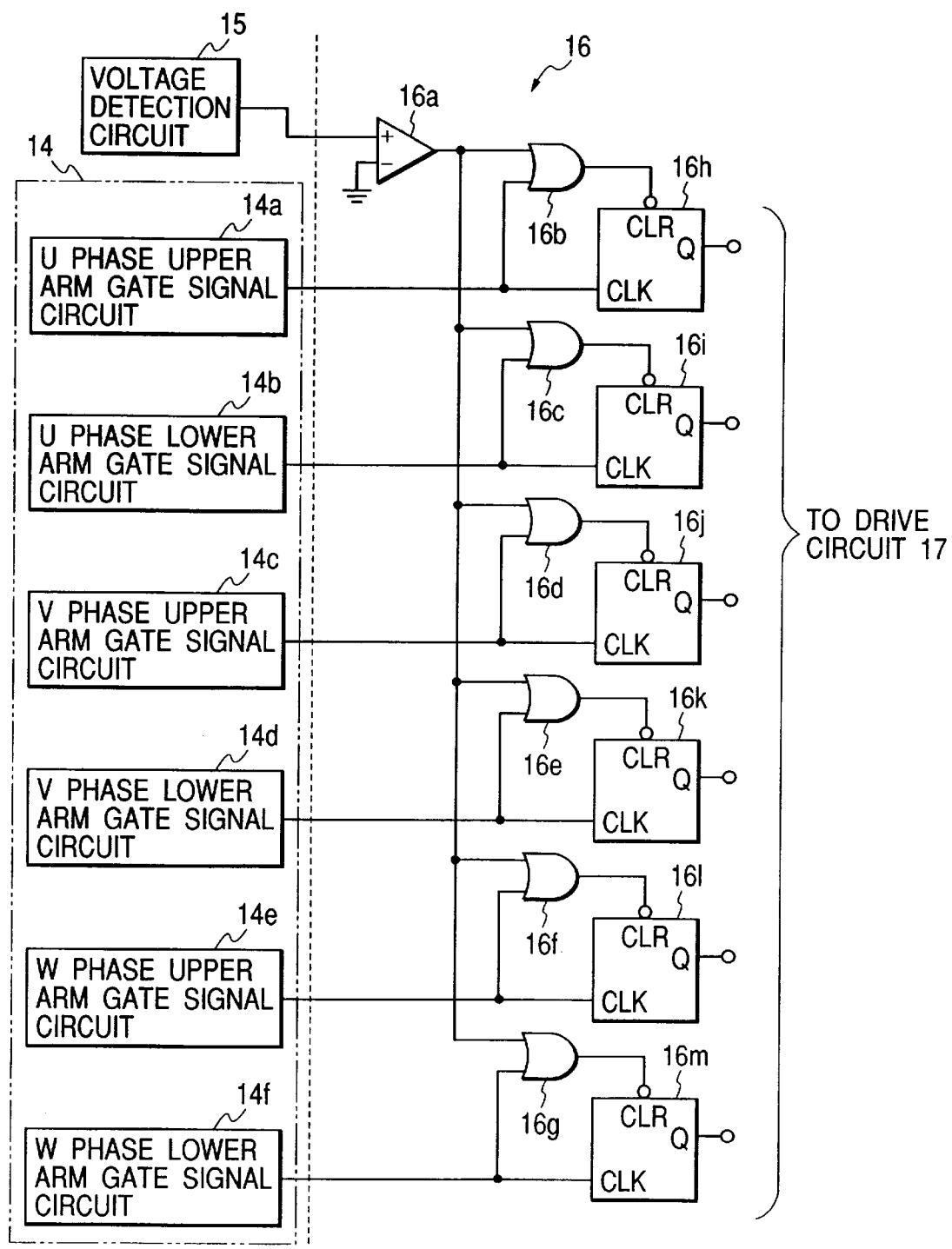
FIG. 4 is a block diagram of a gate signal generation circuit and a control circuit in FIG. 2.

As shown in FIG. 4, the gate signal generation circuit 14 includes sub gate signal generation circuits 14a, 14b, 14c, 14d, 14e, and 14f corresponding to the U-phase upper bridge arm, the U-phase lower bridge arm, the V-phase upper bridge arm, the V-phase lower bridge arm, the W-phase upper bridge arm, and the W-phase lower bridge arm respectively. The sub gate signal generation circuits 14a–14f output PWM (pulse width modulation) signals respectively.

The voltage detection circuit 15 operates to detect the voltage VPN across the series combination of the resonant capacitor 6 and the resonant reactor 7, that is, the voltage between the upper end of the upper bridge arm and the lower end of the lower bridge arm.

The control circuit 16 includes a comparator 16a, OR gates 16b, 16c, 16d, 16e, 16f, and 16g, and latch circuits 16h, 16i, 16j, 16k, 16l, and 16m. The OR gates 16b, 16c, 16d, 16e, 16f, and 16g correspond to the U-phase upper bridge arm, the U-phase lower bridge arm, the V-phase upper bridge arm, the V-phase lower bridge arm, the W-phase upper bridge arm, and the W-phase lower bridge arm, respectively. The latch circuits 16h, 16i, 16j, 16k, 16l, and 16m correspond to the U-phase upper bridge arm, the U-phase lower bridge arm, the V-phase upper bridge arm, the V-phase lower bridge arm, the W-phase upper bridge arm, and the W-phase lower bridge arm, respectively.

A first input terminal of the comparator 16a is connected to the output terminal of the voltage detection circuit 15. Thus, the comparator 16a receives the output signal of the voltage detection circuit 15 which represents the voltage VPN across the series combination of the resonant capacitor 6 and the resonant reactor 7, that is, the voltage between the upper end of the upper bridge arm and the lower end of the lower bridge arm. A second input terminal of the comparator 16a is subjected to a predetermined reference voltage such as a ground potential. The comparator 16a operates to compare the voltage VPN with the ground potential to decide whether or not the voltage VPN is positive. The output terminal of the comparator 16a is connected to first input terminals of the OR gates 16b–16g. Second input terminals of the OR gates 16b, 16c, 16d, 16e, 16f, and 16g are connected to the output terminals of the sub gate signal generation circuits 14a, 14b, 14c, 14d, 14e, and 14f, respectively. The clock input terminals of the latch circuits 16h, 16i, 16j, 16k, 16l, and 16m are connected to the output terminals of the sub gate signal generation circuits 14a, 14b, 14c, 14d, 14e, and 14f, respectively. The clear terminals of the latch circuits 16h, 16i, 16j, 16k, 16l, and 16m are connected to the output terminals of the OR gates 16b, 16c, 16d, 16e, 16f, and 16g, respectively. The Q output terminals of the latch circuits 16h–16m are connected to the drive circuit 17. The latch circuits 16h–16m output gate signals which are transmitted to the gates of the main switching devices 3a–3f via the drive circuit 17, respectively.

Regarding commutations in the U phase, the control portion 13 operates as follows. With reference to FIG. 3, before the occurrence of a commutation from the main switching device 3a to the flywheel diode 4b, the upper arm PWM signal outputted from the sub gate signal generation circuit 14a is in its high level state (its on state) and the lower arm PWM signal outputted from the sub gate signal generation circuit 14b is in its low level state (its off state). In addition, the upper arm gate signal outputted from the latch circuit 16h is in its high level state (its on state), and the lower arm gate signal outputted from the latch circuit 16i is in its low level state (its off state). Furthermore, the voltage VPN between the upper end of the upper bridge arm and the lower end of the lower bridge arm is positive so that the comparator 16a outputs a high-level signal to the OR gates 16b–16g.

At the moment "ta" in FIG. 3, the upper arm PWM signal changes from its high level state (its on state) to its low level state (its off state), and the lower arm PWM signal changes from its low level state (its off state) to its high level state (its on state). The lower arm gate signal outputted from the latch circuit 16i moves to its high level state (its on state) in response to the low-to-high change of the lower arm PWM signal. Accordingly, at the moment "ta", the main switching device 3b is turned on so that there occurs a closed-loop resonant path having the resonant capacitor 6, the resonant reactor 7, and the main switching devices 3a and 3b. Thus, at the moment "ta", a resonant current starts to flow in the resonant path.

Then, the resonant current reverses, and the absolute value of the resonant current becomes greater than that of the load current at the moment "tb" in FIG. 3. Accordingly, a current flows through the fly wheel diodes 4a and 4b so that the voltage VPN between the upper end of the upper bridge arm and the lower end of the lower bridge arm becomes negative. Thus, at the moment "tb", the output signal of the comparator 16a falls into its low level state (its off state). The low-level output signal of the comparator 16a travels to the latch circuit 16h via the OR gate 16b. The upper arm gate signal outputted from the latch circuit 16h falls into its low level state (its off state) in response to the low-level output signal of the comparator 16a. The low-level upper arm gate signal travels from the latch circuit 16h to the gate of the main switching device 3a via the drive circuit 17. Thus, after the moment "tb", the main switching device 3a is turned off by the low-level upper arm gate signal. As a result, regarding the main switching device 3a, zero-voltage switching is implemented, and there occurs substantially no turn-off switching loss.

At the moment "te" in FIG. 3, the upper arm gate signal outputted from the latch circuit 16h changes to its high level state (its on state), and the main switching device 3a is turned on so that there occurs a closed-loop resonant path having the resonant capacitor 6, the resonant reactor 7, and the main switching devices 3a and 3b. Thus, at the moment "te", a resonant current starts to flow in the resonant path. Then, the resonant current reverses, and the absolute value of the resonant current becomes greater than that of the load current at the moment "tf" in FIG. 3. Accordingly, a current flows through the flywheel diodes 4a and 4b so that the voltage VPN between the upper end of the upper bridge arm and the lower end of the lower bridge arm becomes negative. Thus, at the moment "tf", the output signal of the comparator 16a falls into its low level state (its off state). The low-level output signal of the comparator 16a travels to the latch circuit 16i via the OR gate 16c.

The lower arm gate signal outputted from the latch circuit 16i falls into its low level state (its off state) in response to the low-level output signal of the comparator 16a. The low-level lower arm gate signal travels from the latch circuit 16i to the gate of the main switching device 3b via the drive circuit 17. Thus, after the moment "tf", the main switching device 3b is turned off by the low-level lower arm gate signal. As a result, regarding the main switching device 3b, zero-voltage switching is implemented, and there occurs substantially no turn-off switching loss.

Second Embodiment

A second embodiment of this invention is similar to the first embodiment thereof except for the following design change. In the second embodiment of this invention, a voltage detection circuit 15 is designed to detect whether or not the voltage VPN between the upper end of the upper bridge arm and the lower end of the lower bridge arm drops to a predetermined positive voltage near 0 V after the resonance by the resonant capacitor 6 and the resonant reactor 7 starts. When the voltage VPN drops to the predetermined positive voltage, a main switching device is turned off in response to the output signal of the voltage detection circuit 15.

Third Embodiment

A third embodiment of this invention is similar to the first embodiment thereof except for the following design change. In the third embodiment of this invention, a voltage detection circuit 15 is designed to detect whether or not the voltage VPN between the upper end of the upper bridge arm and the lower end of the lower bridge arm becomes substantially 0 V after the resonance by the resonant capacitor 6 and the resonant reactor 7 starts. When the voltage VPN becomes substantially 0 V, a main switching device is turned off in response to the output signal of the voltage detection circuit 15.

Fourth Embodiment

A fourth embodiment of this invention is similar to the first embodiment thereof except for the following design change. In the fourth embodiment of this invention, a load 5 includes an AC rotating machine having a regenerative braking function.

Fifth Embodiment

A fifth embodiment of this invention is similar to the first embodiment thereof except for the following design change. In the fifth embodiment of this invention, main switching devices 3a–3f are composed of MOSFET's, power transistors, thyristors, gate turn-off thyristors (GTO's), or MOS control thyristors (MCT's).

Sixth Embodiment

A sixth embodiment of this invention is similar to the first embodiment thereof except that the flywheel diodes 4a–4f are replaced by rectifiers of another type.

Seventh Embodiment

A seventh embodiment of this invention is similar to the first embodiment thereof except that a resonant circuit 8 has a combination of one or more resonant capacitors, and one or more resonant reactors.

Eighth Embodiment

An eighth embodiment of this invention is similar to the first embodiment thereof except that a resonant capacitor 6 is connected to the negative bus line side while a resonant reactor 7 is connected to the positive bus line side.

Ninth Embodiment

A ninth embodiment of this invention is similar to the first embodiment thereof except for the following design changes. In the ninth embodiment of this invention, a control circuit 16 includes a microcomputer having a combination of an input/output port, a CPU, a RAM, and a ROM. The microcomputer operates in accordance with a program stored in the ROM.

Figure 5:
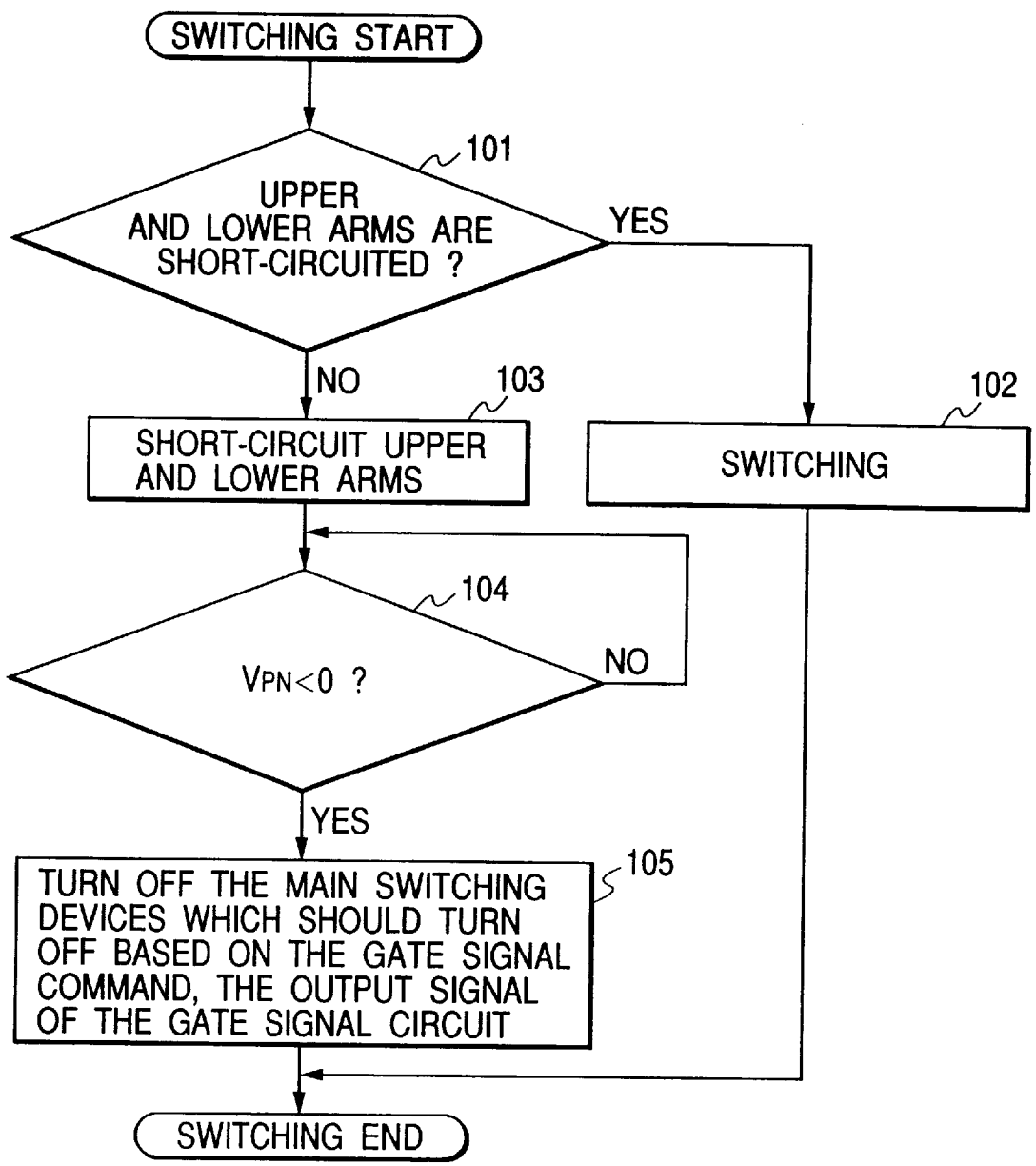
FIG. 5 is a flowchart of a segment of a program for a microcomputer in a ninth embodiment of this invention.

FIG. 5 is a flowchart of a segment of the program which corresponds to one of the U, V, and W phases. The program segment in FIG. 5 is iteratively executed. As shown in FIG. 5, a first step 101 of the program segment decides whether or not the upper end of the upper bridge arm is short-circuited to the lower end of the lower bridge arm. When the upper end of the upper bridge arm is short-circuited to the lower end of the lower bridge arm, the program advances from the step 101 to a step 102. Otherwise, the program advances from the step 101 to a step 103.

The step 102 implements a switching process regarding a related main switching device. After the step 102, the current execution cycle of the program segment ends.

The step 103 short-circuits the upper end of the upper bridge arm to the lower end of the lower bridge arm. After the step 103, the program advances to a step 104.

The step 104 reads the present value of the voltage VPN between the upper end of the upper bridge arm and the lower end of the lower bridge arm which is represented by the output signal of the voltage detection circuit 15. The step 104 decides whether or not the present value of the voltage VPN is negative. When the present value of the voltage VPN is negative, the program advances from the step 104 to a step 105. Otherwise, the step 104 is repeated.

The step 105 turns off a main switching device. After the step 105, the current execution cycle of the program segment ends.

Tenth Embodiment

Figure 6:
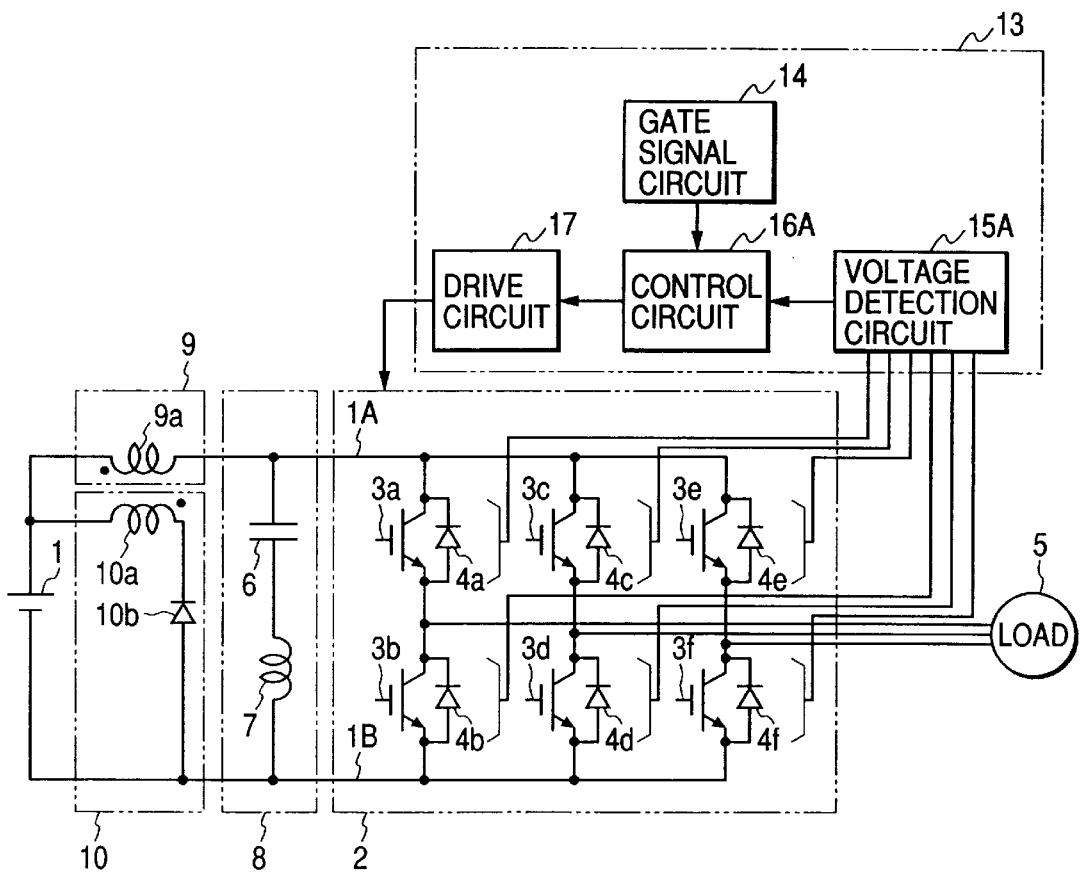
FIG. 6 is a diagram of a resonant power converter according to a tenth embodiment of this invention.

FIG. 6 shows a tenth embodiment of this invention which is similar to the first embodiment except for the following design changes. The embodiment of FIG. 6 includes a voltage detection circuit 15A and a control circuit 16A which replace the voltage detection circuit 15 and the control circuit 16 (see FIG. 2).

The voltage detection circuit 15A is connected to the collectors and the emitters of the main switching devices 3a–3f. The voltage detection circuit 15A has portions for detecting the collector-emitter voltages of the main switching devices 3a–3f respectively. The voltage detection circuit 15A informs the control circuit 16A of the detected collector-emitter voltages of the main switching devices 3a–3f. The control circuit 16A has comparing portions which decide whether or not the detected collector-emitter voltages of the main switching devices 3a–3f are equal to a predetermined negative voltage after the upper end of the upper bridge arm is short-circuited to the lower end of the lower bridge arm. For each of the main switching devices 3a–3f, the control circuit 16A turns off the main switching device when the detected collector-emitter voltage thereof is equal to the predetermined negative voltage. For example, the predetermined negative voltage is equal to −1.5 V.

Figure 7:
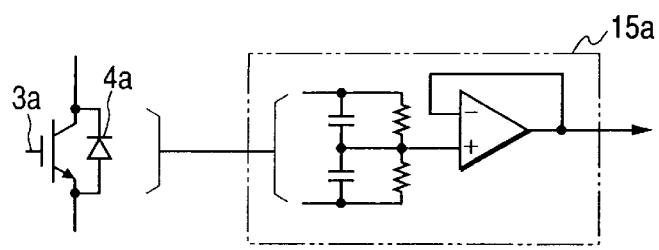
FIG. 7 is a diagram of a portion of a voltage detection circuit in FIG. 6.

The portions of the voltage detection circuit 15A are similar to each other. FIG. 7 shows one of the portions of the voltage detection circuit 15A. As shown in FIG. 7, one portion 15a of the voltage detection circuit 15A includes a voltage dividing network of two resistors and two capacitors which divides the collector-emitter voltage of a related main switching device 3a. The voltage dividing network is followed by a buffer which is connected to the control circuit 16A.

Eleventh Embodiment

Figure 8:
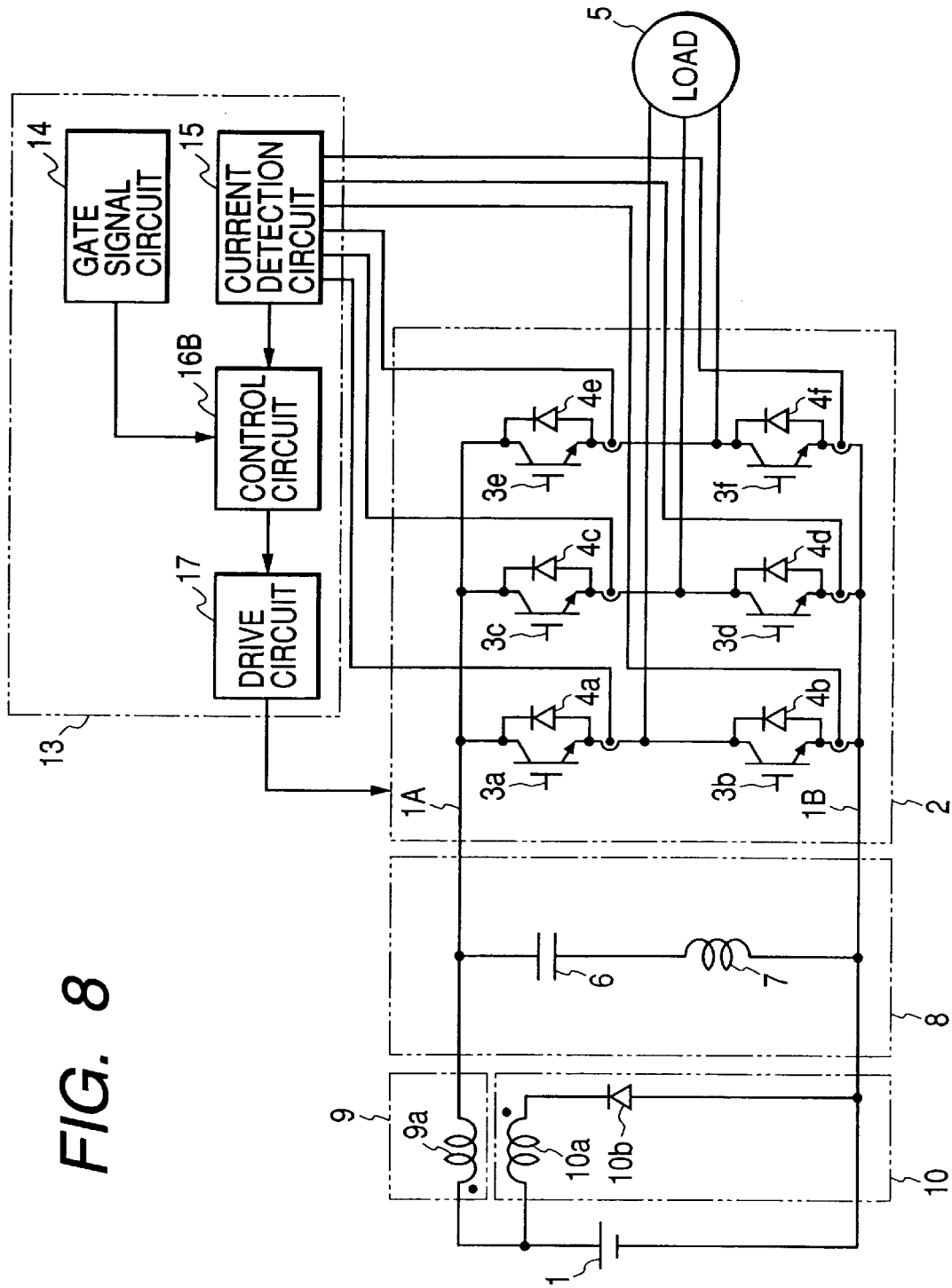
FIG. 8 is a diagram of a resonant power converter according to an eleventh embodiment of this invention.

FIG. 8 shows an eleventh embodiment of this invention which is similar to the first embodiment (see FIG. 2) thereof except for the following design changes. The embodiment of FIG. 8 includes a current detection circuit 18 and a control circuit 16B which replace the voltage detection circuit 15 and the control circuit 16 (see FIG. 2).

The current detection circuit 18 is connected to the main switching devices 3a–3f. The current detection circuit 18 has portions which form current mirrors in conjunction with the main switching devices 3a–3f respectively. The portions of the current detection circuit 18 detect currents flowing through the main switching devices 3a–3f respectively. The current detection circuit 18 informs the control circuit 16B of the detected currents through the main switching devices 3a–3f.

It should be noted that the current mirrors may be replaced by devices integrated with respect to the main switching devices 3a–3f as shown in Japanese published examined patent application 8-34221 or Japanese patent 2715399.

The control circuit 16B has comparing portions which decide whether or not the detected currents through the main switching devices 3a–3f are null after the upper end of the upper bridge arm is short-circuited to the lower end of the lower bridge arm. For each of the main switching devices 3a–3f, the control circuit 16B turns off the main switching device when the detected current therethrough is null.

Twelfth Embodiment

A twelfth embodiment of this invention is similar to the eleventh embodiment thereof except for the following design change. In the twelfth embodiment, a current detection circuit 18 includes current detection diodes connected in parallel with the flywheel diodes 4a–4f respectively.

The current detection circuit 18 has portions for detecting currents flowing through the flywheel diodes 4a–4f respectively. The current detection circuit 18 informs a control circuit 16B of the detected currents through the flywheel diodes 4a–4f.

The control circuit 16B has comparing portions which decide whether or not the detected currents through the flywheel diodes 4 are non-zero after the upper end of the upper bridge arm is short-circuited to the lower end of the lower bridge arm. For each of the main switching devices 3a–3f, the control circuit 16B turns off the main switching device when the detected current through a related flywheel diode is non-zero.

Thirteenth Embodiment

Figure 9:
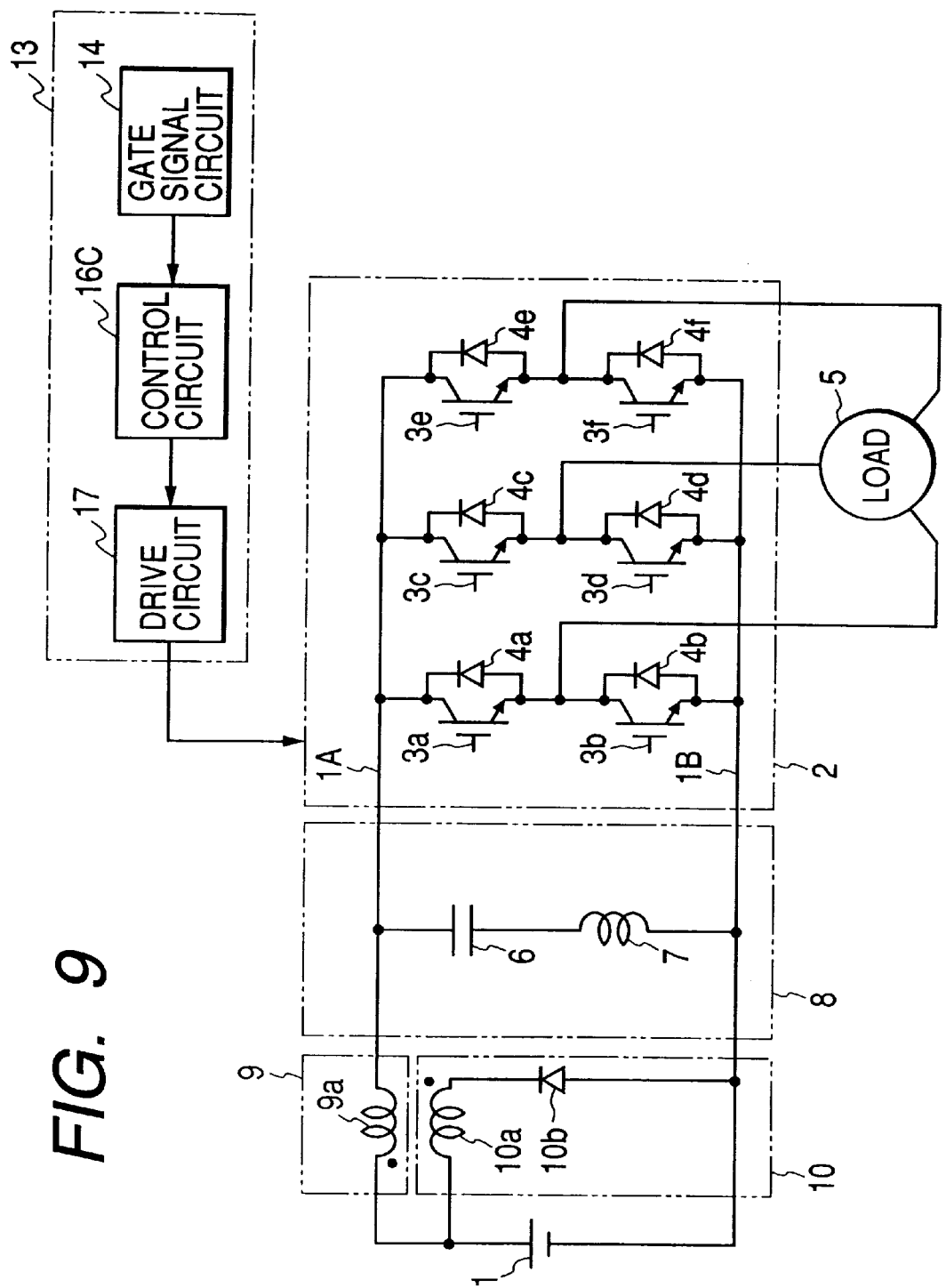
FIG. 9 is a diagram of a resonant power converter according to a thirteenth embodiment of this invention.

FIG. 9 shows a thirteenth embodiment of this invention which is similar to the first embodiment (see FIG. 2) thereof except for the following design changes. The voltage detection circuit (see FIG. 2) is omitted from the embodiment of FIG. 9.

The embodiment of FIG. 9 includes a control circuit 16C which replaces the control circuit 16 (see FIG. 2). Preferably, the control circuit 16C is composed of a microcomputer having a combination of an input/output port, a CPU, a RAM, and a ROM. The microcomputer operates in accordance with a program stored in the ROM.

Figure 10:
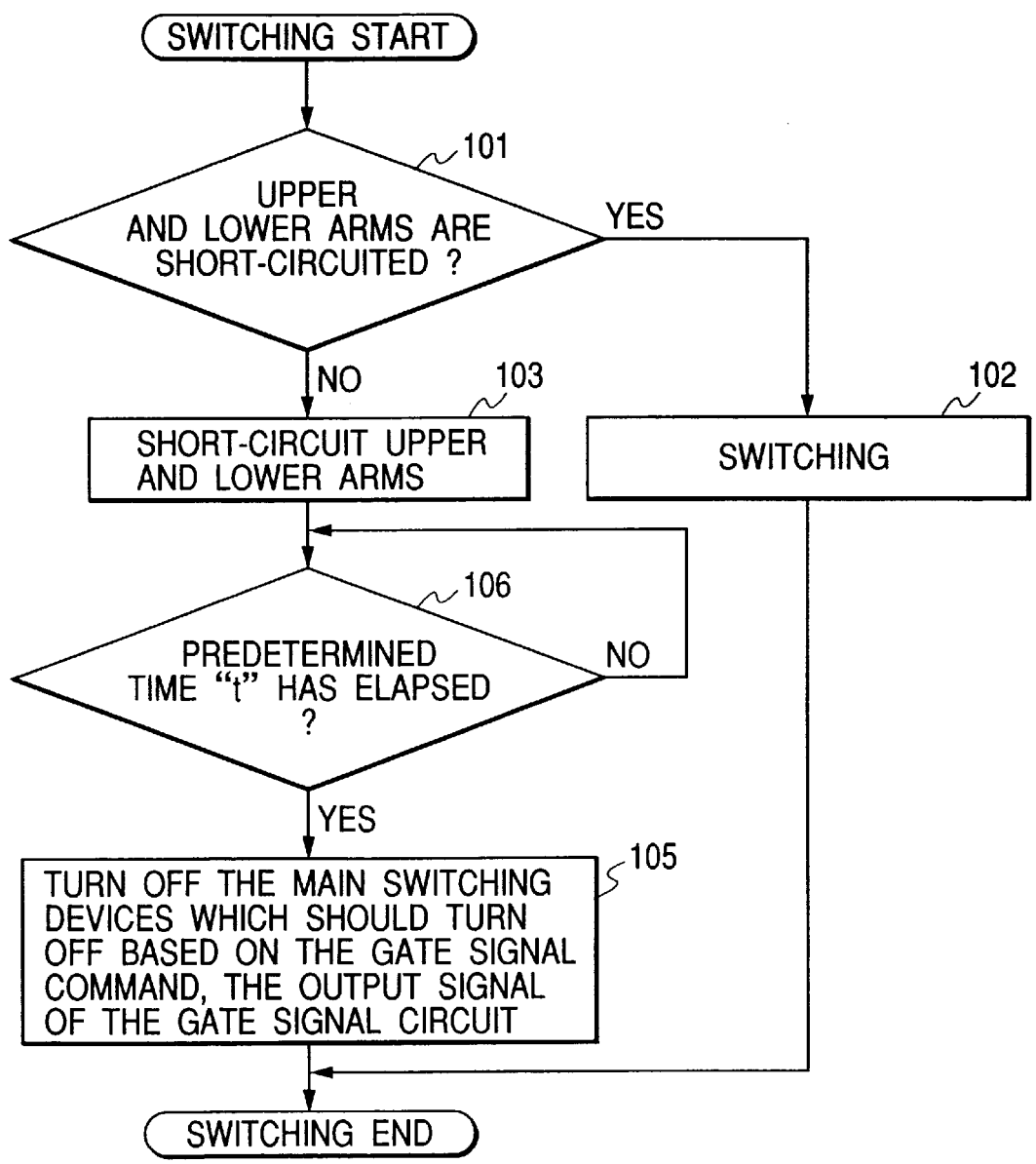
FIG. 10 is a flowchart of a segment of a program for a microcomputer in the thirteenth embodiment of this invention.

FIG. 10 is a flowchart of a segment of a program for the 20 microcomputer. The program segment in FIG. 10 corresponds to one of the U, V, and W phases. The program segment in FIG. 10 is iteratively executed. As shown in FIG. 10, a first step 101 of the program segment decides whether or not the upper end of the upper bridge arm is short-circuited to the lower end of the lower bridge arm. When the upper end of the upper bridge arm is short-circuited to the lower end of the lower bridge arm, the program advances from the step 101 to a step 102. Otherwise, the program advances from the step 101 to a step 103.

The step 102 implements a switching process regarding a related main switching device. After the step 102, the current execution cycle of the program segment ends.

The step 103 short-circuits the upper end of the upper bridge arm to the lower end of the lower bridge arm to start resonance. After the step 103, the program advances to a step 106.

The step 106 decides whether or not a predetermined time interval "t" has elapsed since the moment of the start of the resonance. When the predetermined time interval "t" has elapsed, the program advances from the step 106 to a step 105. Otherwise, the step 106 is repeated.

The step 105 turns off a main switching device. After the step 105, the current execution cycle of the program segment ends.

Figure 11:
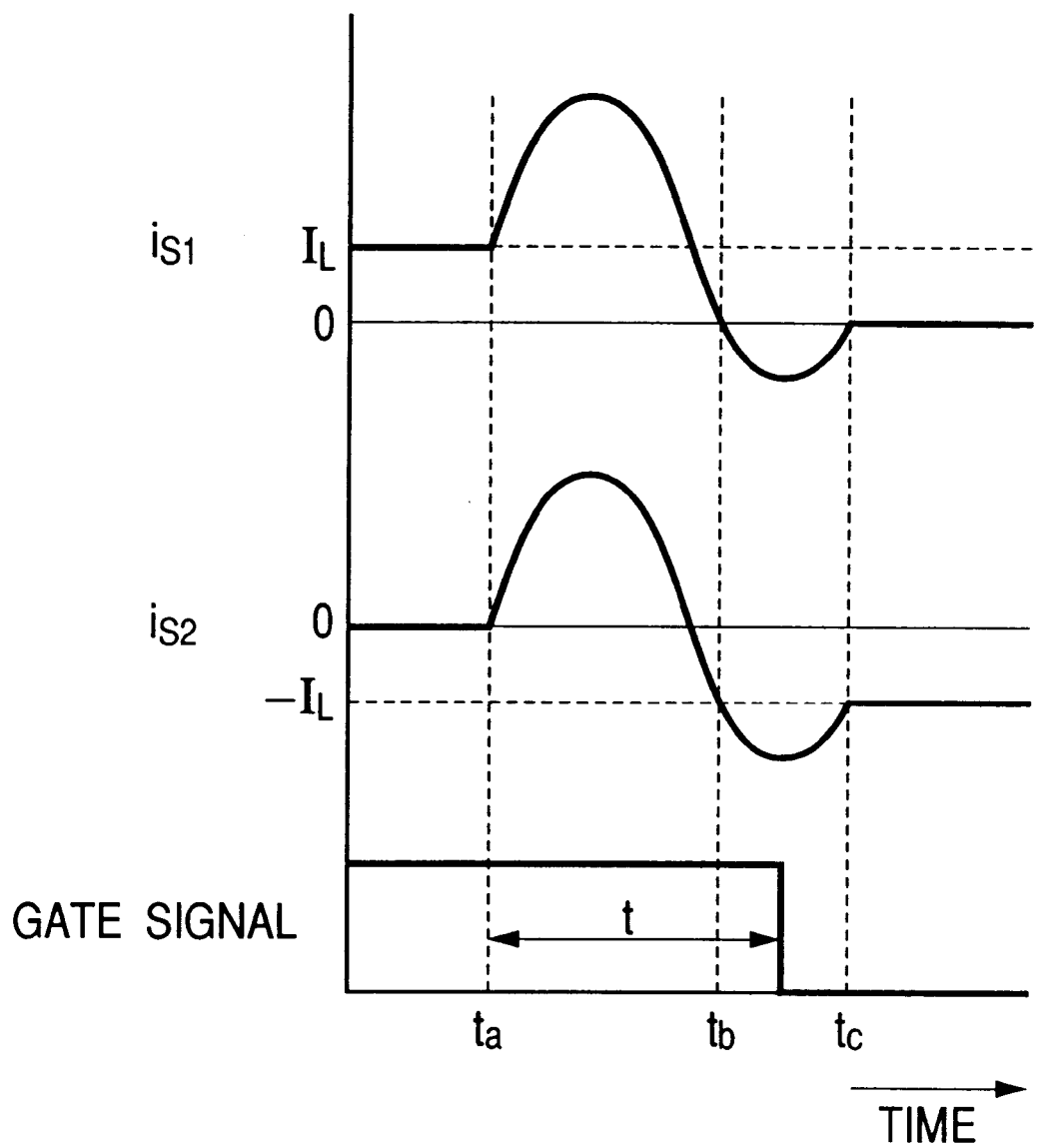
FIG. 11 is a time-domain diagram of currents, and a signal which occur in the resonant power converter in FIG. 9.

The period of the resonance is given as $2\pi(LC)^{1/2}$, where "C" denotes the capacitance of the resonant capacitor 6 and "L" denotes the inductance of the resonant reactor 7. The start of the predetermined time interval "t" coincides with the start of the resonance. The end of the predetermined time interval "t" is located between a point of $\pi(LC)^{1/2}$ and a point of $2\pi(LC)^{1/2}$ measured from the moment of the start of the resonance. Preferably, the end of the predetermined time interval "t" coincides with a moment at which the absolute value of the resonant current exceeds that of the load current. Therefore, as shown in FIG. 11, when the predetermined time interval "t" has elapsed since the moment "ta" of the start of the resonance, a gate signal is changed to its low level state so that a related main switching device is turned off.

Fourteenth Embodiment

Figure 12:
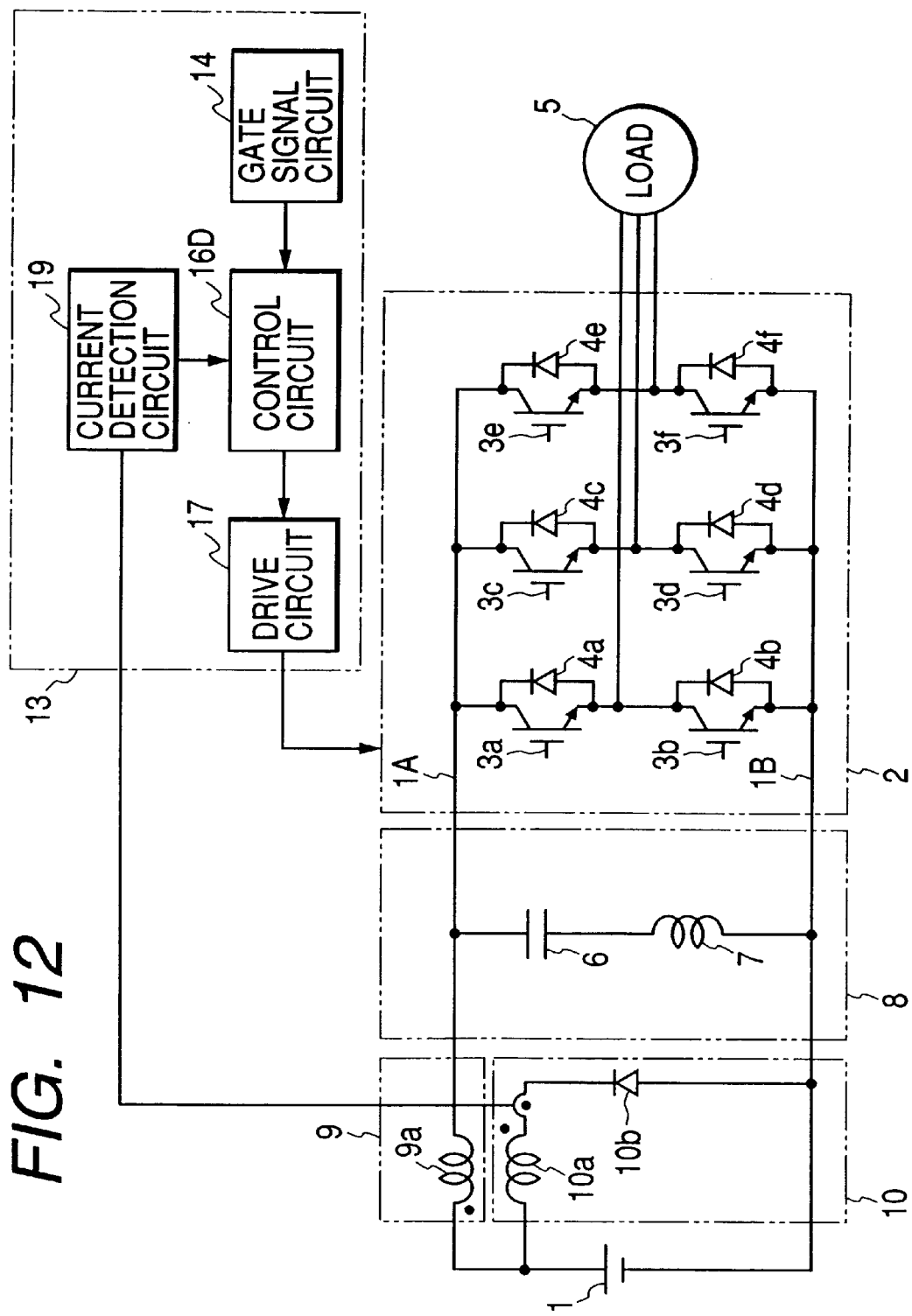
FIG. 12 is a diagram of a resonant power converter according to a fourteenth embodiment of this invention.

FIG. 12 shows a fourteenth embodiment of this invention which is similar to the thirteenth embodiment (see FIG. 9) thereof except for the following design changes.

The embodiment of FIG. 12 includes a current detection circuit 19 which is connected to the line or lines extending from the reactor 10a in the voltage clamp circuit 10. The current detection circuit 19 operates to detect a current iLC flowing through the reactor 10a. For example, the current detection circuit 19 includes a sensor for detecting the voltage across the reactor 10a. Alternatively, the current detection circuit 19 may include a Hall element located near the reactor 10a.

The embodiment of FIG. 12 includes a control circuit 16D instead of the control circuit 16C (see FIG. 9). The control circuit 16D receives the output signal of the current detection circuit 19 which represents the detected current iLC through the reactor 10a. The control circuit 16D decides whether or not the detected current iLC is minimum. In addition, the control circuit 16D decides whether or not the detected current iLC is zero. The control circuit 16D implements short-circuiting the upper end of the upper bridge arm to the lower end of the lower bridge arm in response to the results of these decisions.

Figure 13:
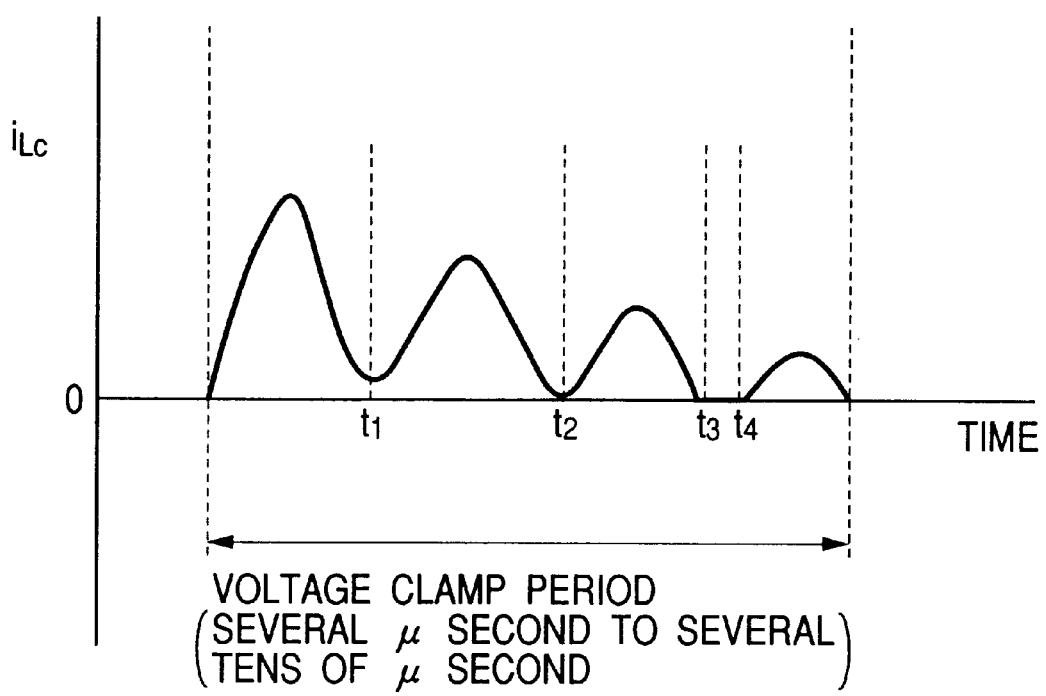
FIG. 13 is a time-domain diagram of a current flowing through a voltage clamp reactor in FIG. 12.

As shown in FIG. 13, the current iLC through the reactor 10a vibrates due to the resonance by the resonant circuit 8. Generally, a resistance component causes the current iLC to damp in accordance with the lapse of time. At moments t1 and t2, the current iLC is minimum. During the time interval between moments t3 and t4, the current iLC is zero. In the case where a short-circuiting command occurs between the moments t1 and t2, tuning on a main switching device to short-circuit the upper end of the upper bridge arm to the lower end of the lower bridge arm is executed at the moment t2 at which the current iLC becomes minimum. In the case where a short-circuiting command occurs between the moments t2 and t3, tuning on a main switching device to short-circuit the upper end of the upper bridge arm to the lower end of the lower bridge arm is executed at a point during the time interval between the moments t3 and t4 in which the current iLC is zero. Accordingly, it is possible to reduce a switching loss of the main switching device which occurs at the time of short-circuiting the upper end of the upper bridge arm to the lower end of the lower bridge arm.

Preferably, the control circuit 16D is composed of a microcomputer having a combination of an input/output port, a CPU, a RAM, and a ROM. The microcomputer operates in accordance with a program stored in the ROM.

Figure 14:
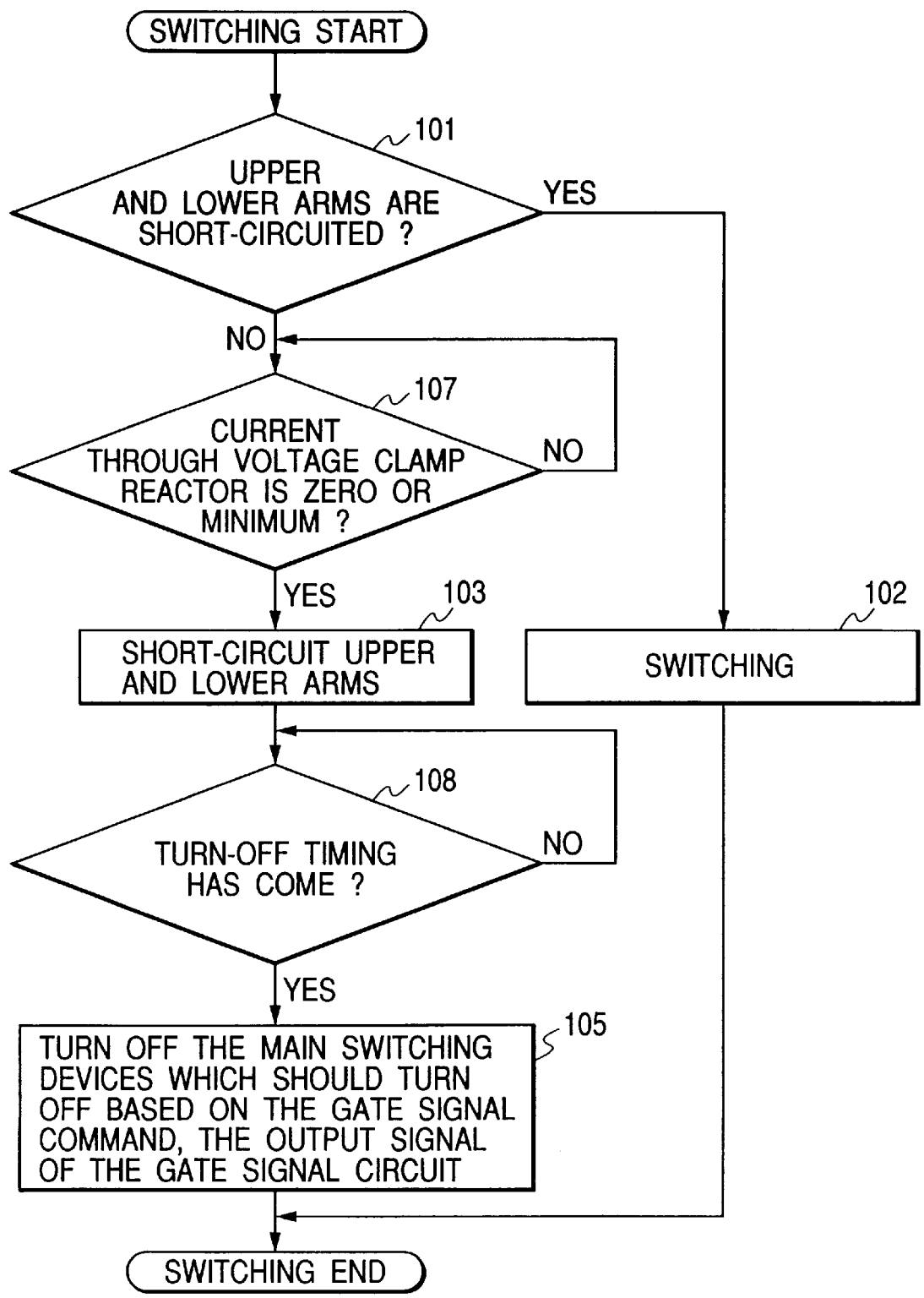
FIG. 14 is a flowchart of a segment of a program for a microcomputer in the fourteenth embodiment of this invention.

FIG. 14 is a flowchart of a segment of a program for the microcomputer. The program segment in FIG. 14 corresponds to one of the U, V, and W phases. The program segment in FIG. 14 is iteratively executed. As shown in FIG. 14, a first step 101 of the program segment decides whether or not the upper end of the upper bridge arm is short-circuited to the lower end of the lower bridge arm. When the upper end of the upper bridge arm is short-circuited to the lower end of the lower bridge arm, the program advances from the step 101 to a step 102. Otherwise, the program advances from the step 101 to a step 107.

The step 102 implements a switching process regarding a related main switching device. After the step 102, the current execution cycle of the program segment ends.

The step 107 decides whether or not the detected current iLC through the reactor 10a is zero. In addition, the step 107 decides whether or not the detected current iLC through the reactor 10a is minimum. When the current iLC is zero or minimum, the program advances from the step 107 to a step 103. Otherwise, the step 107 is repeated.

The step 103 short-circuits the upper end of the upper bridge arm to the lower end of the lower bridge arm to start resonance. After the step 103, the program advances to a step 108.

The step 108 decides whether or not the present moment agrees with a turn-off timing in a way similar to that mentioned with reference to FIG. 5, FIG. 6, or FIG. 8. When the present moment agrees with the turn-off timing, the program advances from the step 108 to a step 105. Otherwise, the step 108 is repeated.

The step 105 turns off a main switching device. After the step 105, the current execution cycle of the program segment ends.

Figure 15:
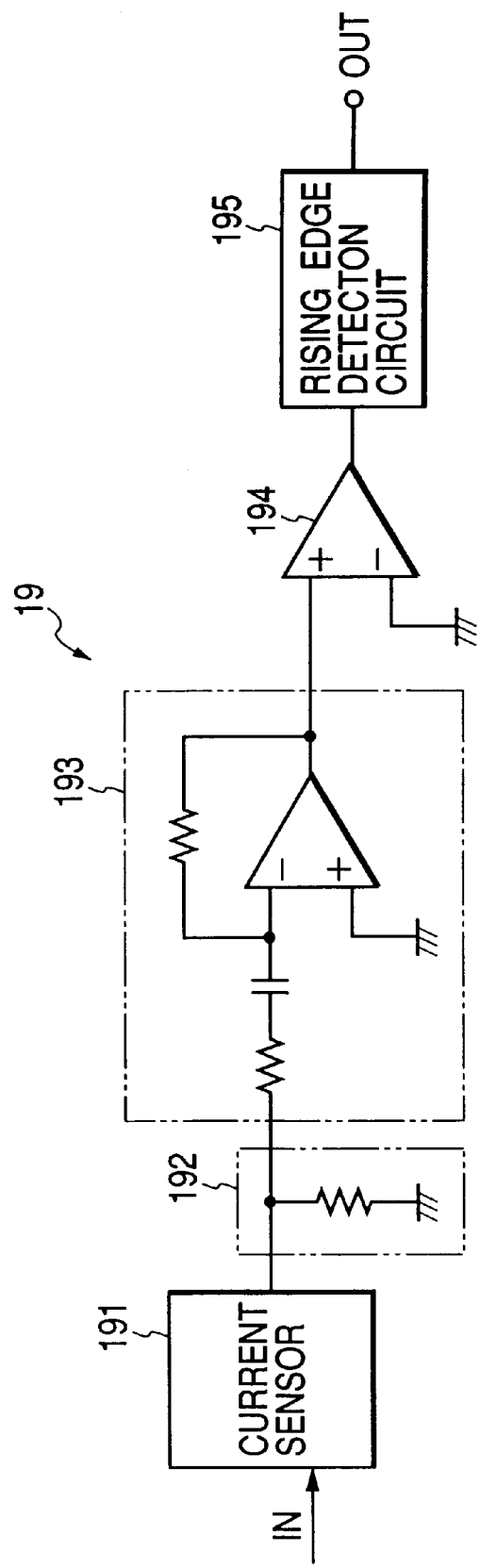
FIG. 15 is a diagram of a current detection circuit in FIG. 12.

As shown in FIG. 15, the current detection circuit 19 includes a current sensor 191, a voltage converter 192, a differential calculation circuit 193, a comparator 194, and an edge detection circuit 195 which are successively connected in that order. The current sensor 191 detects a current flowing in the voltage clamp circuit 10. The current sensor 191 includes, for example, a Hall element. The current sensor 191 outputs a signal to the voltage converter 192 which represents the detected current. The voltage converter 192 changes the output signal of the current sensor 191 into a corresponding voltage signal having a magnitude which is proportional to the detected current. The voltage converter 192 outputs the voltage signal to the differential calculation circuit 193. The differential calculation circuit 193 differentiates the output signal of the voltage converter 192 with respect to time. The differential calculation circuit 193 generates a differentiation-resultant signal having a value which is positive or negative in accordance with the slope of the detected current. When the detected current passes a minimum value, the value of the differentiation-resultant signal changes from a negative to a positive. The differential calculation circuit 193 outputs the differentiation-resultant signal to the comparator 194. The comparator 194 operates to compare the output signal of the differential calculation circuit 193 with a ground potential (that is, zero). The comparator 194 generates a binary comparison-resultant signal. When the detected current passes a minimum value, the comparison-resultant signal changes from a low level to a high level. The comparator 194 outputs the comparison-resultant signal to the edge detection circuit 195. The edge detection circuit 195 senses a low-to-high change (that is, a rising edge) in the output signal of the comparator 194, thereby detecting whether or not the current in the voltage clamp circuit 10 becomes minimum. The edge detection circuit 195 informs the control circuit 16D of whether or not the current in the voltage clamp circuit 10 becomes minimum.

Fifteenth Embodiment

A fifteenth embodiment of this invention is similar to one of the first to the fourteenth embodiments thereof except that a control circuit 16E replaces the control circuit 16, 16A, 16B, 16C, or 16D.

Figure 16:
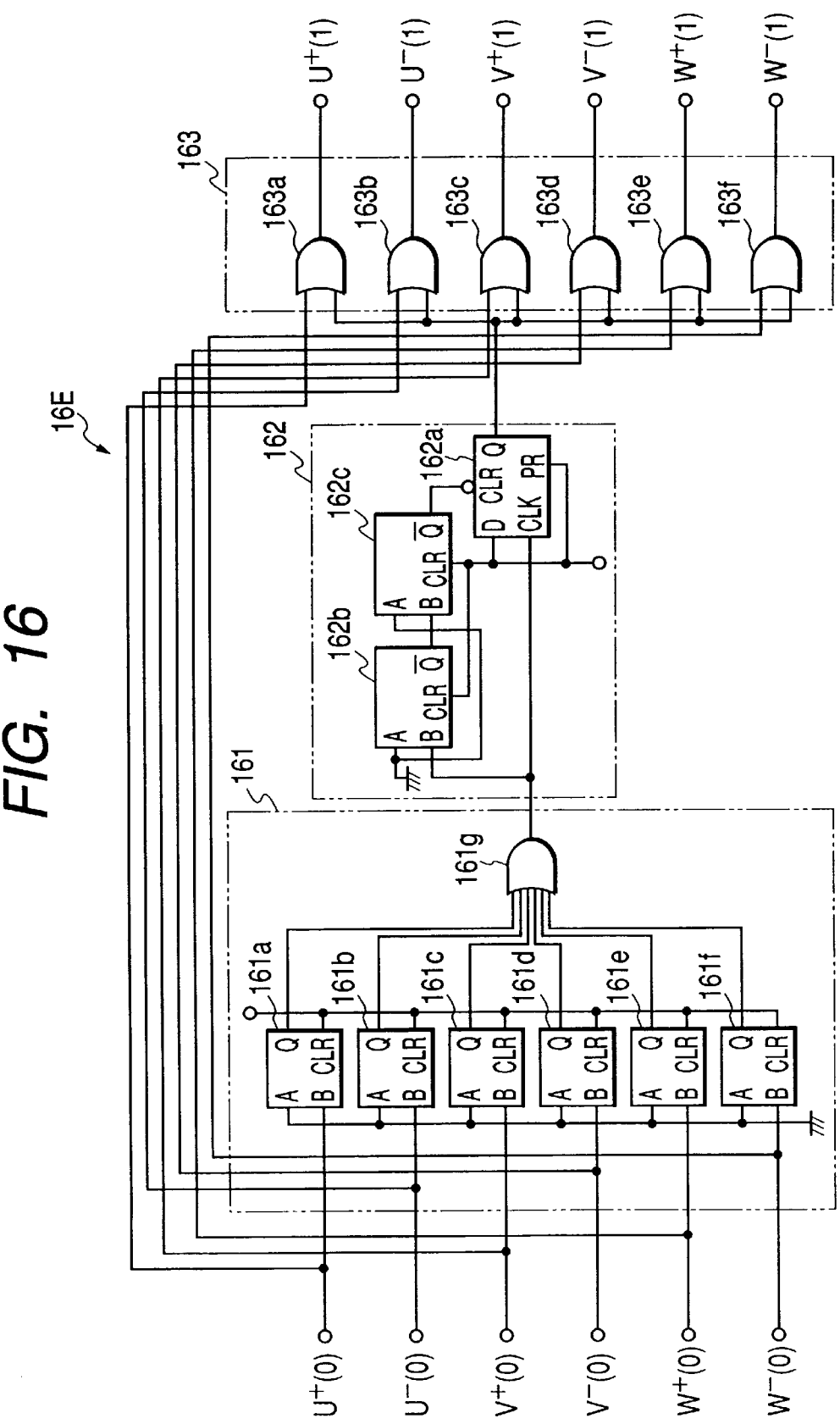
FIG. 16 is a block diagram of a control circuit in a resonant power converter according to a fifteenth embodiment of this invention.

As shown in FIG. 16, the control circuit 16E includes a timing detecting portion 161, a pulse signal generating portion 162, and an OR portion 163. The timing detecting portion 161 receives a U-phase upper arm PWM signal U$^+$(0), a U-phase lower arm PWM signal U$^-$(0), a V-phase upper arm PWM signal V$^+$(0), a V-phase lower arm PWM signal V$^-$(0), a W-phase upper arm PWM signal W$^+$(0), and a W-phase lower arm PWM signal W$^-$(0) from the sub gate signal generation circuits 14$a$, 14$b$, 14$c$, 14$d$, 14$e$, and 14$f$ (see FIG. 4), respectively. The timing detecting portion 161 operates to detect gate-signal switching timings on the basis of the upper and lower arm PWM signals U$^+$(0), U$^-$(0), V$^+$(0), V$^-$(0), W$^+$(0), and W$^-$(0). The timing detecting portion 161 outputs a signal to the pulse signal generating portion 162 which represents the detected gate-signal switching timings. The pulse signal generating portion 162 generates, in response to the output signal of the timing detecting portion 16$l$, a short-circuiting signal for short-circuiting the upper end of the upper bridge arm to the lower end of the lower bridge arm. The pulse signal generating portion 162 outputs the short-circuiting signal to the OR portion 163. The OR portion 163 receives the upper and lower arm PWM signals U$^+$(0), U$^-$(0), V$^+$(0), V$^-$(0), W$^+$(0), and W$^-$(0) from the sub gate signal generation circuits 14$a$, 14$b$, 14$c$, 14$d$, 14$e$, and 14$f$ (see FIG. 4). The OR portion 163 executes OR operations between the short-circuiting signal and the upper and lower arm PWM signals U$^+$(0), U$^-$(0), V$^+$(0), V$^-$(0), W$^+$(0), and W$^-$(0), thereby generating a U-phase upper arm signal U$^+$(1), a U-phase lower arm signal U$^-$(1), a V-phase upper arm signal V$^+$(1), a V-phase lower arm signal V$^-$(1), a W-phase upper arm signal W$^+$(1), and a W-phase lower arm signal W$^-$(1). The OR portion 163 outputs the upper and lower arm signals U$^+$(1), U$^-$(1), V$^+$(1), V$^-$(1), W$^+$(1), and W$^-$(1) to the drive circuit 17.

The timing detecting portion 161 includes one-shot multivibrators 161$a$, 161$b$, 161$c$, 161$d$, 161$e$, and 161$f$ which output pulses in response to rising edges in the upper and lower arm PWM signals U$^+$(0), U$^-$(0), V$^+$(0), V$^-$(0), W$^{30}$(0), and W$^-$(0), respectively. The timing detecting portion 161 further includes an OR circuit 161$g$ following the one-shot multivibrators 161$a$161$f$. The OR circuit 161$g$ outputs a pulse signal in response to the pulses from the one-shot multivibrators 161$a$–161$f$. The pulse signal outputted from the OR circuit 161$g$ represents every switching timing.

The pulse signal generating portion 162 includes a latch circuit 162$a$ which receives the pulse signal from the OR circuit 161$g$. The latch circuit 162$a$ detects every rising edge in the output signal of the OR circuit 161$g$, outputting a high-level short-circuiting signal. The high-level short-circuiting signal is transmitted from the latch circuit 162$a$ to the drive circuit 17 via OR circuits 163$a$, 163$b$, 163$c$, 163$d$, 163$e$, and 163$f$ in the OR portion 163. All the main switching devices 3$a$–3$f$ in the power converting portion 2 simultaneously turn on in response to the high-level short-circuiting signal, thereby short-circuiting the upper end of the upper bridge arm to the lower end of the lower bridge arm. Simultaneously turning on the main switching devices 3$a$–3$f$ means simultaneously short-circuiting the three phases (the U, V, and W phases).

The pulse signal generating portion 162 further includes one-shot multivibrators 162$b$ and 162$c$. The one-shot multivibrator 162$b$ receives the output signal of the OR circuit 161$g$. The one-shot multivibrator 162$b$ generates a pulse signal in response to the output signal of the OR circuit 161$g$. The pulse signal generated by the one-shot multivibrator 162$b$ falls into a low level at a timing which is determined by a rising edge in the output signal of the OR circuit 161$g$. The pulse signal generated by the one-shot multivibrator 162$b$ remains in its low level state during a predetermined time interval. The one-shot multivibrator 162$b$ outputs the pulse signal to the one-shot multivibrator 162$c$. The one-shot multivibrator 162$c$ generates a pulse signal in response to the output signal of the one-shot multivibrator 162$b$. The pulse signal generated by the one-shot multivibrator 162$c$ falls into a low level at a timing which is determined by a rising edge in the output signal of the one-shot multivibrator 162$b$. The pulse signal generated by the one-shot multivibrator 162$c$ remains in its low level state during a predetermined time interval. The one-shot multivibrator 162$c$ outputs the pulse signal to the clear terminal of the latch circuit 162$a$. The latch circuit 162$a$ changes its output signal to a low level when the clear terminal of the latch circuit 162$a$ receives a low-level signal.

Figure 17:
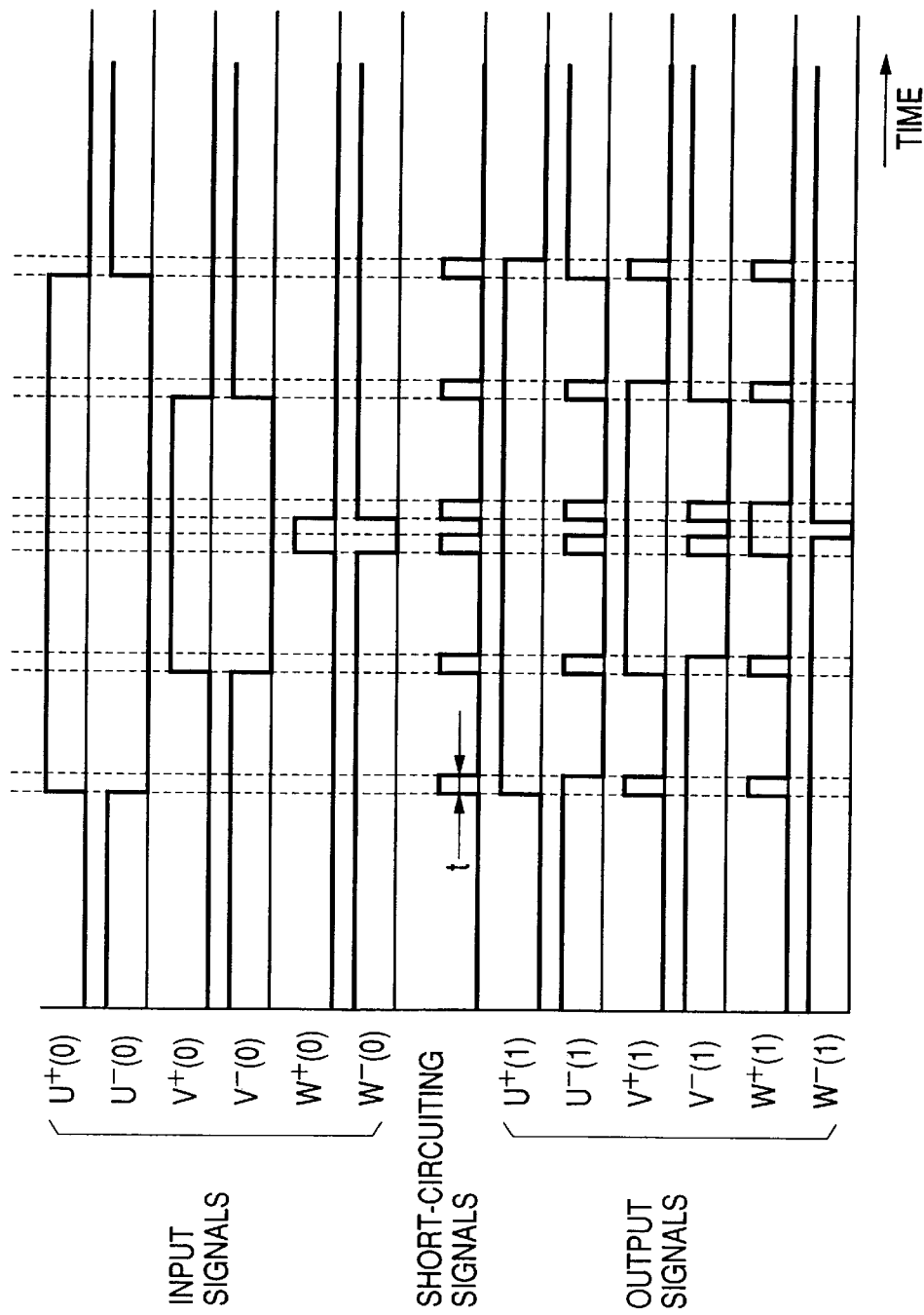
FIG. 17 is a time-domain diagram of signals which occur in the control circuit of FIG. 16.

As shown in FIG. 17, when one of the upper and lower arm PWM signals U$^+$(0), U$^-$(0), V$^+$(0), V$^-$(0), W$^+$(0), and W$^-$(0) changes to its high level state, a short-circuiting signal which remains in its high level state only during a given time interval "t" is outputted from the pulse signal generating portion 162. The high-level short-circuiting signal is transmitted to the drive circuit 17 as the upper and lower arm signals U$^+$(1), U$^-$(1), V$^+$(1), V$^-$(1), W$^+$(1), and W$^-$(1). All the main switching devices 3$a$–3$f$ in the power converting portion 2 simultaneously turn on in response to the high-level short-circuiting signal, thereby short-circuiting the upper end of the upper bridge arm to the lower end of the lower bridge arm. The given time interval "t" is set similarly to the predetermined time interval "t" mentioned with reference to FIG. 10.

Short-circuiting the upper end of the upper bridge arm to the lower end of the lower bridge arm is canceled depending on time. It should be noted that short-circuiting the upper end of the upper bridge arm to the lower end of the lower bridge arm may be canceled when the voltage VPN between the upper end of the upper bridge arm and the lower end of the lower bridge arm is negative as in the embodiments of FIG. 2, FIG. 5, and FIG. 6.

It should be noted that simultaneously short-circuiting the three phases (the U, V, and W phases) may be replaced by short-circuiting only one phase or two phases.

Simultaneously short-circuiting the three phases provides the following advantages. Since one third of the resonant current flows through each of the three phases, the resistance components of the devices in each phase generate heat at a reduced rate. The peak value of the resonant current through the devices in each phase is reduced to ⅓ so that a current stress thereon is decreased. The control of simultaneously short-circuiting the three phases is simpler than the phase-by-phase control.

Sixteenth Embodiment

Figure 18:
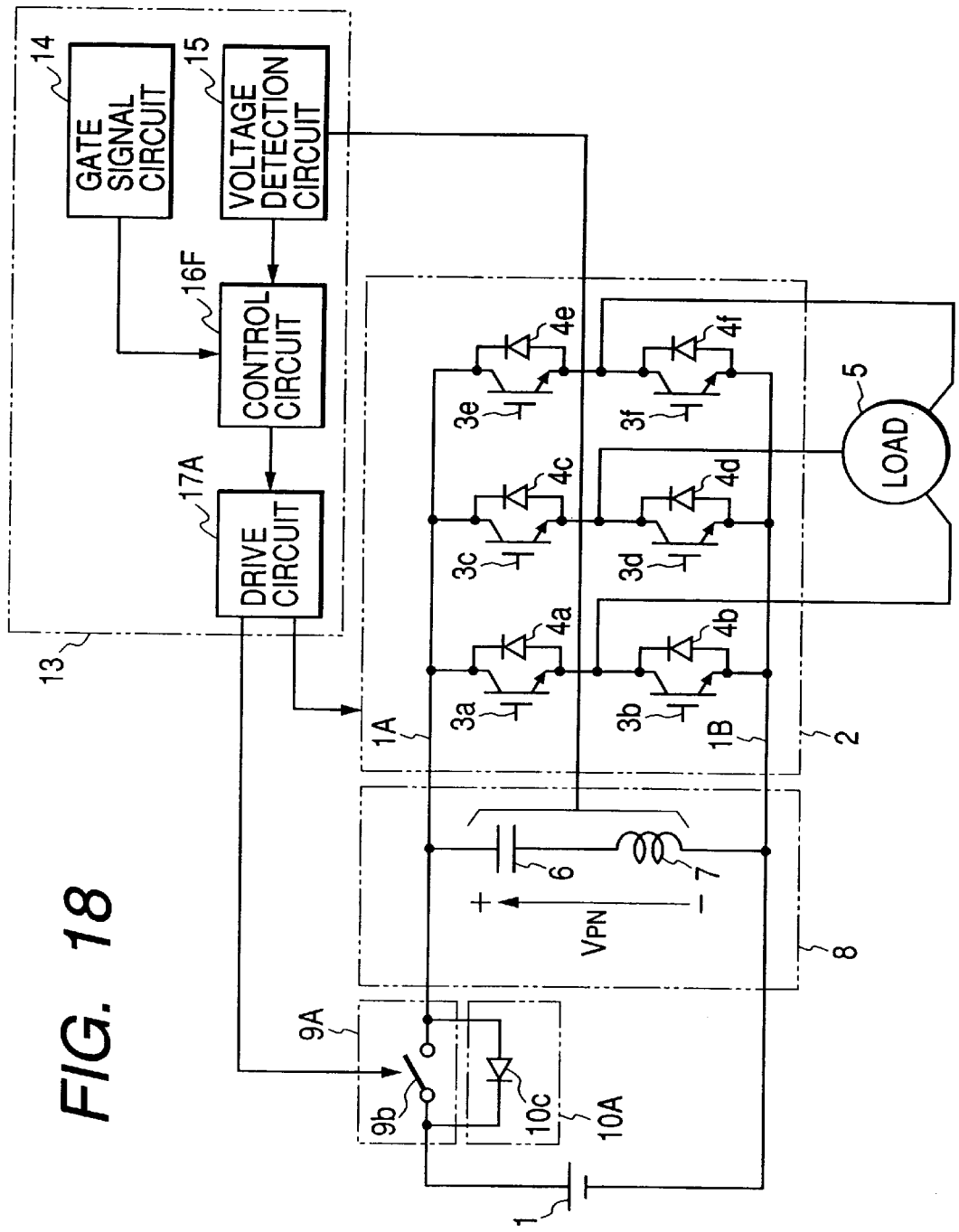
FIG. 18 is a diagram of a resonant power converter according to a sixteenth embodiment of this invention.

FIG. 18 shows a sixteenth embodiment of this invention which is similar to the first embodiment (see FIG. 2) thereof except for the following design changes. The embodiment of FIG. 18 includes a short-circuit avoiding device 9A, a voltage clamp circuit 10A, a control circuit 16F, and a drive circuit 17A which replace the short-circuit avoiding device 9A, the voltage clamp circuit 10, the control circuit 16, and the drive circuit 17 (see FIG. 2).

The short-circuit avoiding device 9A includes a switching device 9b interposed in the positive bus line 1A. The control circuit 16F operates to control the switching device 9b via the drive circuit 17A. Specifically, the control circuit 16F turns off the switching device 9b during the time interval between a moment before the start of resonance and a moment at which a main switching device is changed to its off state. The switching device 9b includes, for example, a one-direction semiconductor device or a bi-direction semiconductor device.

In the present embodiment, the step 103 in FIG. 5 or FIG. 10 may be preceded by a step for turning off the switching device 9b, and the step 105 in FIG. 5 or FIG. 10 may be followed by a step for turning on the switching device 9b.

As shown in FIG. 18, the voltage clamp circuit 10A includes a diode 10c. The anode of the diode 10c is connected to the junction between the switching device 9b and the resonant circuit 8 (or the power converting portion 2). The cathode of the diode 10c is connected to the junction between the switching device 9b and the positive terminal of the DC power source 1.

The voltage clamp circuit 10A may be omitted provided that the main switching elements 3a–3f use semiconductor devices having a high rating voltage (a high withstanding voltage).

Seventeenth Embodiment

A seventeenth embodiment of this invention is similar to the sixteenth embodiment (see FIG. 18) thereof except for the following design changes. In the seventeenth embodiment, a load 5 includes an AC rotating machine having a regenerative braking function. In addition, the switching device 9b uses a bi-direction semiconductor device such as a static induction transistor (SIT).

Eighteenth Embodiment

An eighteenth embodiment of this invention is similar to the first embodiment (see FIG. 2) thereof except for the following design changes. The voltage clamp circuit 10 (see FIG. 2) is omitted from the eighteenth embodiment of this invention. In the eighteenth embodiment, the main switching elements 3a–3f use semiconductor devices having a high rating voltage (a high withstanding voltage).

Nineteenth Embodiment

Figure 19:
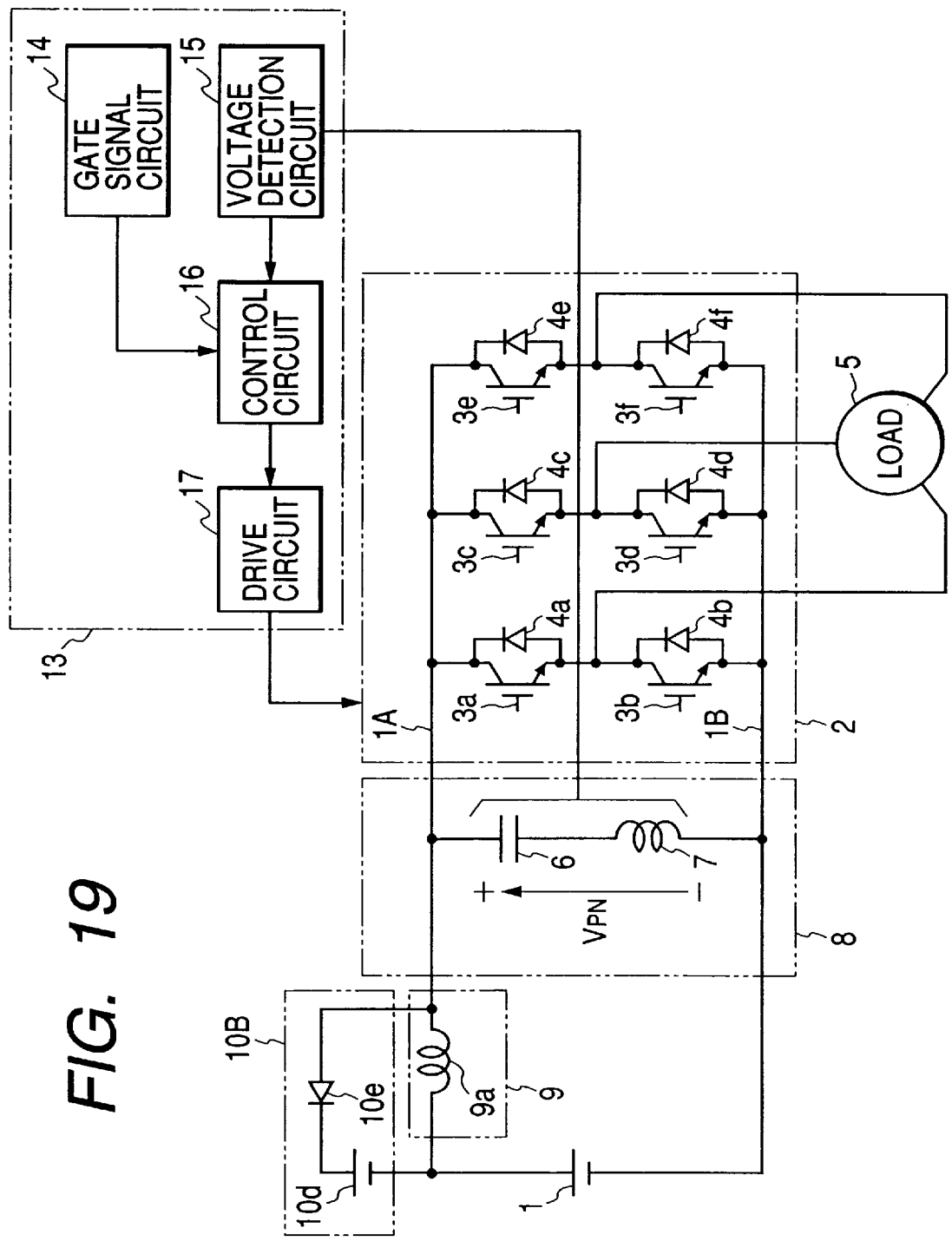
FIG. 19 is a diagram of a resonant power converter according to a nineteenth embodiment of this invention.

FIG. 19 shows a nineteenth embodiment of this invention which is similar to the first embodiment (see FIG. 2) thereof except for the following design changes. The embodiment of FIG. 19 includes a voltage clamp circuit 10B which replaces the voltage clamp circuit 10 (see FIG. 2).

As shown in FIG. 19, the voltage clamp circuit 10B includes a DC power source 10d and a diode 10e. The negative terminal of the DC power source 10d is connected to the junction between the positive terminal of the DC power source 1 and the reactor 9a in the short-circuit avoiding device 9. The positive terminal of the DC power source 10d is connected to the cathode of the diode 10e. The anode of the diode 10e is connected to the junction between the short-circuit avoiding device 9 and the resonant circuit 8 (or the power converting portion 2).

In the embodiment of FIG. 19, the level to which the voltage is clamped is raised by the voltage generated by the DC power source 10d, and hence the time interval of clamp and power regeneration (power return) is shortened. Accordingly, it is easy to drive the load 5.

It should be noted that the DC power source 10d may be omitted.

Twentieth Embodiment

Figure 20:
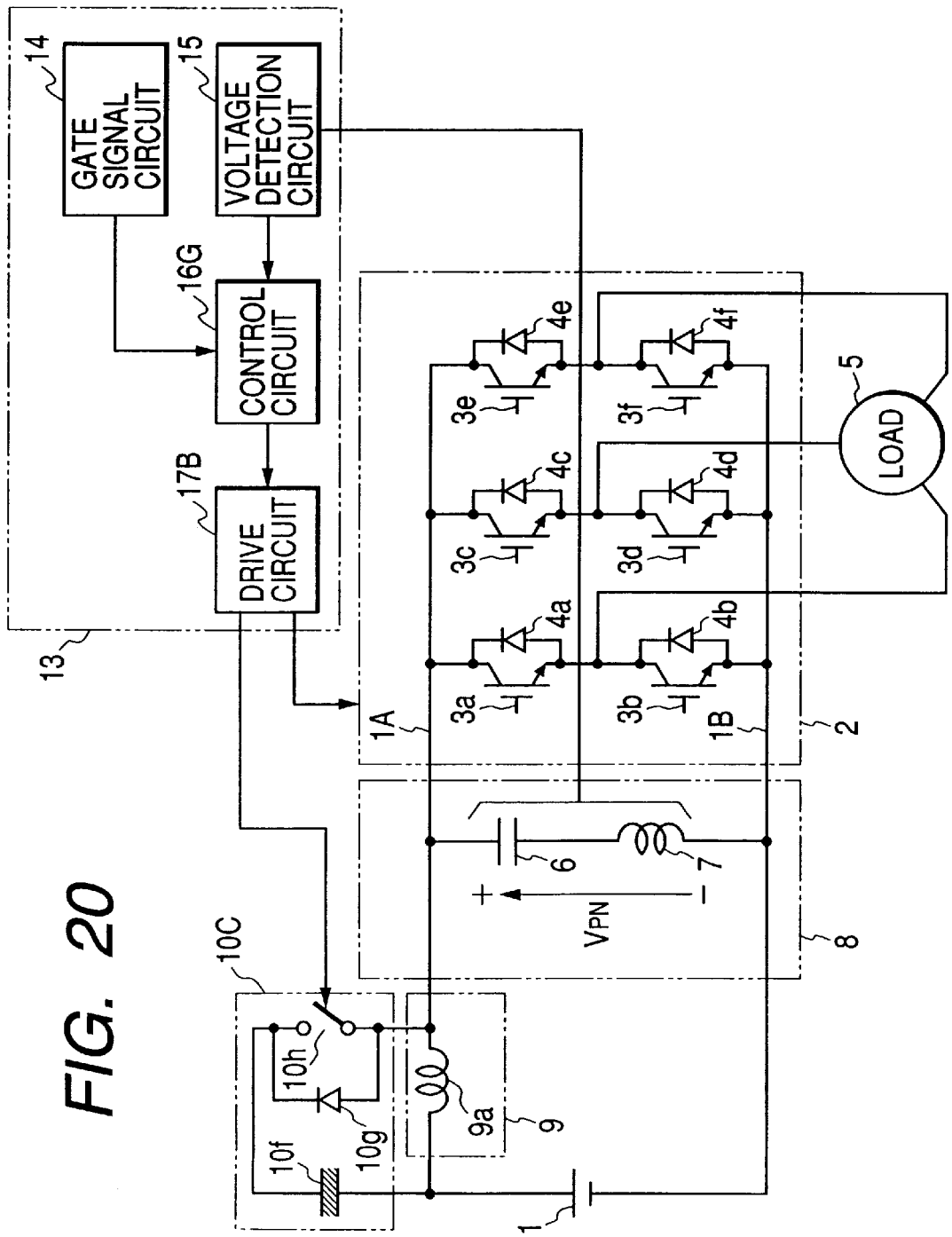
FIG. 20 is a diagram of a resonant power converter according to a twentieth embodiment of this invention.

FIG. 20 shows a twentieth embodiment of this invention which is similar to the first embodiment (see FIG. 2) thereof except for the following design changes. The embodiment of FIG. 20 includes a voltage clamp circuit 10C, a control circuit 16G, and a drive circuit 17B which replace the voltage clamp circuit 10, the control circuit 16, and the drive circuit 17 (see FIG. 2).

As shown in FIG. 20, the voltage clamp circuit 10C includes a capacitor 10f, a diode 10g, and a switching device 10h. The capacitor 10f has a predetermined great capacitance. The switching device 10h includes, for example, a semiconductor device. One end of the capacitor 10f is connected to the junction between the positive terminal of the DC power source 1 and the reactor 9a in the short-circuit avoiding device 9. The other end of the capacitor 10f is connected to the cathode of the diode 10g. The anode of the diode 10g is connected to the junction between the short-circuit avoiding device 9 and the resonant circuit 8 (or the power converting portion 2). The switching device 10h is connected between the anode and the cathode of the diode 10g. The control circuit 16G operates to control the switching device 10h via the drive circuit 17B. During every clamping process, the switching device 10h is controlled to charge and discharge the capacitor 10f.

During every clamping process, power is returned to the capacitor 10f via the diode 10g so that the capacitor 10f is charged. The charging of the capacitor 10f increases the voltage thereacross. During a latter half of the clamping process, the switching device 10h is turned off to discharge the capacitor 10f. Regarding the capacitor 10f, it is preferable that the charging time interval and the discharging time interval are equal to each other.

It should be noted the capacitor 10f may be alternately and cyclically charged and discharged at a predetermined period during every clamping process.

Twenty-First Embodiment

Figure 21:
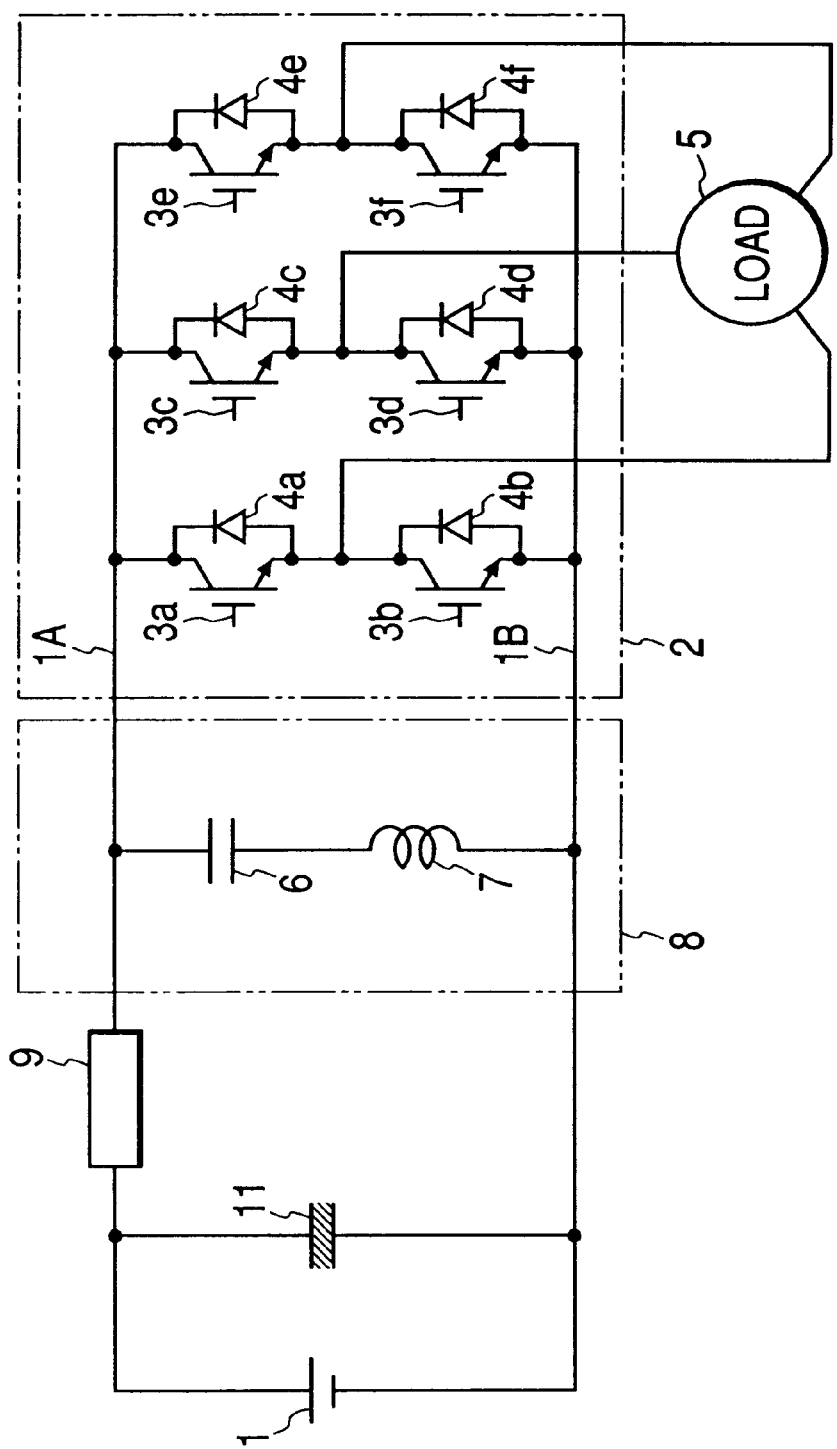
FIG. 21 is a diagram of a resonant power converter according to a twenty-first embodiment of this invention.

FIG. 21 shows a twenty-first embodiment of this invention which is similar to one of the first to the twentieth embodiments thereof that a smoothing capacitor 11 is connected across the DC power source 1. Preferably, the smoothing capacitor 11 is close to the power converting portion 2.

Twenty-Second Embodiment

A twenty-second embodiment of this invention is similar to one of the first to the twenty-first embodiments thereof except that each of the upper and lower bridge arms includes two main switching devices, and multi-level power conversion such as 3-level power conversion is implemented.

Twenty-Third Embodiment

Figure 22:
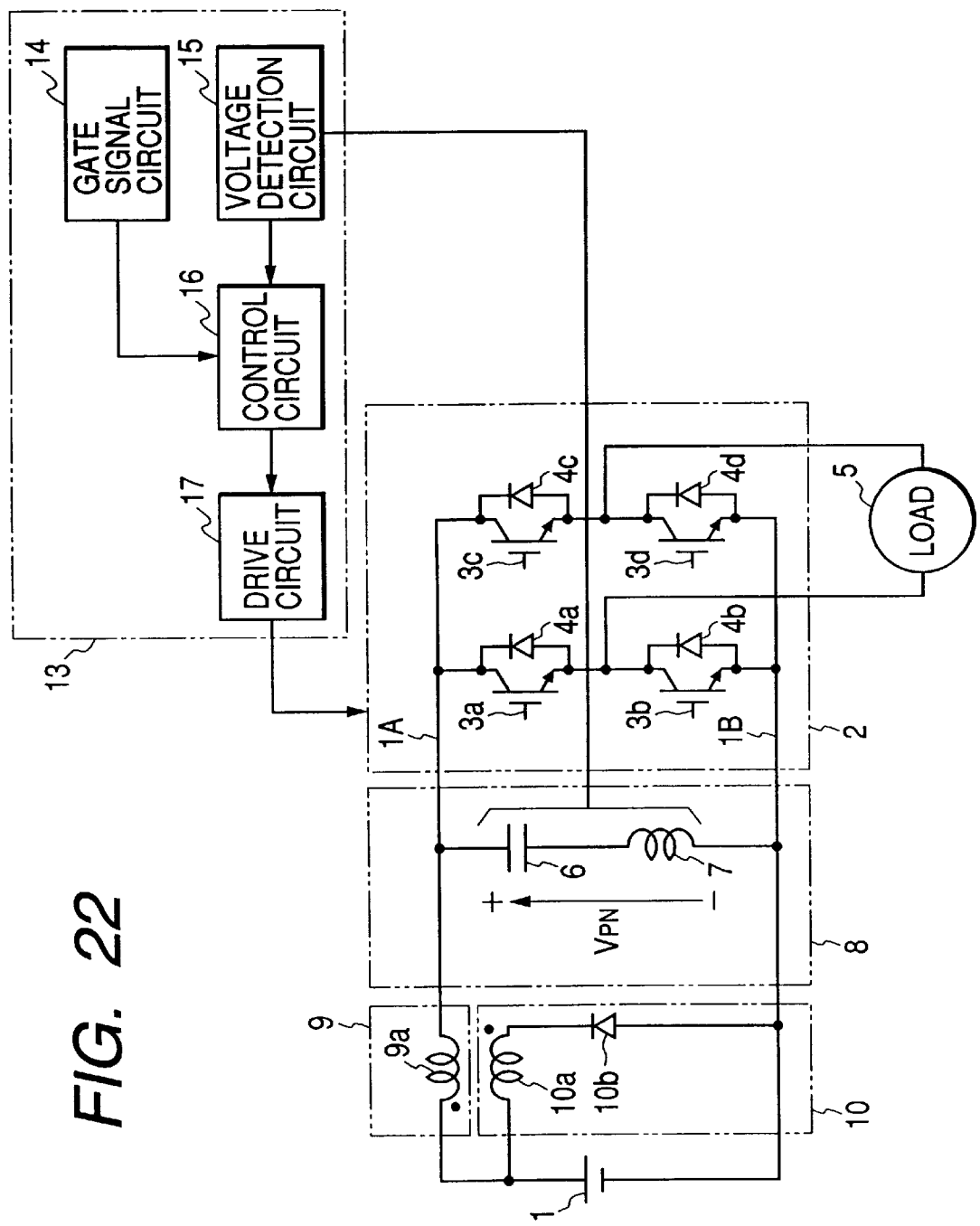
FIG. 22 is a diagram of a resonant power converter according to a twenty-third embodiment of this invention.

FIG. 22 shows a twenty-third embodiment of this invention which is modified from the first embodiment (see FIG. 2) thereof into a design suitable for driving a single-phase load 5.

What is claimed is:

1. A resonant power converter comprising:
a positive bus line (1A);
a negative bus line (1B);
a power converting portion (2) connected between a DC power source (1) and a load (5) for implementing power conversion, the power converting portion including a plurality of main switching devices (3a–3f) connected in series and provided between the positive bus line and the negative bus line, and a plurality of flywheel diodes (4a–4f) connected in antiparallel with the main switching devices respectively for each phase;
a resonant circuit (8) connected between the positive bus line and the negative bus line, and including a resonant capacitor (6) and a resonant reactor (7) connected in series with the resonant capacitor; and
control means (13) for switching the main switching devices in accordance with a predetermined pattern to enable the power converting portion to implement power conversion;
wherein the control means turns on a first switching device which should turn on based on the gate signal command, the output signal of the gate signal circuit, among the main switching devices to start resonance to be implemented by the resonant capacitor and the resonant reactor, and the control means turns off a second switching device which should turn off based on the gate signal command, the output signal of the gate signal circuit, among the main switching devices when a resonant current caused by the resonance is greater than a load current and hence a current flows through one of the flywheel diodes which is connected in antiparallel with the second switching device.

2. A resonant power converter as recited in claim 1, wherein the control means comprises first means for detecting whether or not a voltage between the positive bus line and the negative bus line is negative, and second means for turning off the second switching device when the first means detects that the voltage between the positive bus line and the negative bus line is negative.

3. A resonant power converter as recited in claim 1, wherein the control means comprises first means for detecting whether or not a voltage across the second switching device is negative, and second means for turning off the second switching device when the first means detects that the voltage across the second switching device is negative.

4. A resonant power converter as recited in claim 1, wherein the control means comprises first means for detecting whether or not a current flows through the second switching device, and second means for turning off the second switching device when the first means detects that a current does not flow through the second switching device.

5. A resonant power converter as recited in claim 1, wherein the control means comprises first means for detecting whether or not a current flows through the flywheel diode connected in antiparallel with the second switching device, and second means for turning off the second switching device when the first means detects that a current flows through the flywheel diode connected in antiparallel with the second switching device.

6. A resonant power converter as recited in claim 1, wherein the control means turns off the second switching device when a predetermined time has elapsed since start of the resonance.

7. A resonant power converter as recited in claim 1, further comprising over-current avoiding means (9) for preventing an over current from flowing through the main switching devices when the main switching devices are turned on.

8. A resonant power converter as recited in claim 7, wherein the over-current avoiding means includes a reactor (9a).

9. A resonant power converter as recited in claim 8, wherein the reactor in the over-current avoiding means has a predetermined inductance chosen not to cause resonance in conjunction with the resonant capacitor and the resonant reactor.

10. A resonant power converter as recited in claim 9, wherein the inductance Ld of the reactor in the over-current avoiding means, an inductance Lr of the resonant reactor, and an inductance Lm of the load have a relation as Lm>Ld>Lr.

11. A resonant power converter as recited in claim 8, further comprising a voltage clamp circuit (10) which includes a voltage clamp reactor (10a) coupled with the reactor in the over-current avoiding means for clamping a voltage between the positive bus line and the negative bus line at a predetermined level.

12. A resonant power converter as recited in claim 11, wherein the voltage clamp circuit returns power to the DC power source by a current flowing through the voltage clamp reactor.

13. A resonant power converter as recited in claim 12, wherein the control means includes first means for detecting whether or not a current flowing through the voltage clamp reactor is zero, second means for detecting whether or not a current flowing through the voltage clamp reactor is minimum, and third means for starting the resonance when the first means detects that a current flowing through the voltage clamp reactor is zero or the second means detects that a current flowing through the voltage clamp reactor is minimum.

14. A resonant power converter as recited in claim 7, wherein the over-current avoiding means includes switching means (9b) for disconnecting the power converting portion from the DC power source during a time interval from a moment before start of the resonance to a moment at which the second switching device among the main switching devices is turned off.

15. A resonant power converter as recited in claim 14, wherein the switching means is able to conduct a current in two ways.

16. A resonant power converter as recited in claim 1, further comprising a voltage clamp circuit (10) for clamping a voltage between the positive bus line and the negative bus line at a predetermined level.

17. A resonant power converter as recited in claim 16, wherein the voltage clamp circuit includes a diode (10c) which has an anode connected to the power converting portion and a cathode connected to the DC power source.

18. A resonant power converter as recited in claim 16, wherein the voltage clamp circuit includes a DC voltage source (10d) connected in series with the DC power source, and a diode (10e) which has an anode connected to the power converting portion and a cathode connected to the DC voltage source.

19. A resonant power converter as recited in claim 16, wherein the voltage clamp circuit includes a capacitor (10f) connected in series with the DC power source, a diode (10g) which has an anode connected to the power converting portion and a cathode connected to the capacitor, and switching means for charging and discharging the capacitor during clamp.

20. A resonant power converter comprising:
a positive bus line (1A);
a negative bus line (1B);
a power converting portion (2) connected between a DC power source (1) and a load (5) for implementing power conversion, the power converting portion including a plurality of main switching devices (3a–3f) connected in series and provided between the positive bus line and the negative bus line, and a plurality of flywheel diodes (4a–4f) connected in antiparallel with the main switching devices respectively for each arm;
a resonant circuit (8) connected between the positive bus line and the negative bus line, and including a resonant capacitor (6) and a resonant reactor (7) connected in series with the resonant capacitor; and
control means (13) for turning on the main switching devices to start resonance to be implemented by the resonant capacitor and the resonant reactor, and for turning off a switching device among the main switching devices when the resonance causes a voltage between the positive bus line and the negative bus line to become substantially 0 V.

21. A resonant power converter comprising:
a power converting portion (2) including main switching devices (3a–3f) for a plurality of phases, the power converting portion having an upper arm and a lower arm;
a resonant circuit (8) connected to the power converting portion, and including a resonant capacitor (6) and a resonant reactor (7) connected to the resonant capacitor;
means for short-circuiting the upper arm and the lower arm to each other to enable resonance to be caused by the resonant circuit; and
means for switching the main switching devices to implement commutation during a presence of the resonance.

22. A resonant power converter as recited in claim 21, further comprising short-circuit avoiding means (9) for preventing a short-circuit between the DC power source and the power converting portion during switching of the main switching devices.

23. A resonant power converter as recited in claim 21, further comprising: a positive bus line and a negative bus line wherein the resonant capacitor and the resonant reactor are connected in series with each other to form a series combination, and the series combination of the resonant capacitor and the resonant reactor is directly connected between the positive bus line and the negative bus line.

24. A resonant power converter comprising:
a power converting portion (2) including upper and lower arms, main switching devices (3a–3f) in the upper and lower arms respectively, and flywheel diodes (4a–4f) connected in antiparallel with the main switching devices respectively;
a resonant circuit (8) connected to the power converting portion, and including a resonant capacitor (6) and a resonant reactor (7) connected in series with the resonant capacitor; and
control means (13) for short-circuiting the upper and lower arms to each other to enable resonance to be caused by the resonant circuit, and for switching a designated switching device among the main switching devices when the resonance causes a current to flow through one of the flywheel diodes which is connected in antiparallel with the designated switching device.

25. A resonant power converter as recited in claim 24, wherein the control means includes timing detection means (161) for detecting desired timings at which the main switching devices are switched, and means (162) for short-circuiting the upper and lower arms to each other at timings equal to the detected desired timings.

26. A resonant power converter as recited in claim 24, wherein the control means includes means for turning on all the main switching devices to implement short-circuiting the upper and lower arms to each other.

27. A resonant power converter as recited in claim 24, further comprising a positive bus line and a negative bus line, wherein the resonant capacitor and the resonant reactor are connected in series with each other to form a series combination, and the series combination of the resonant capacitor and the resonant reactor is directly connected between the positive bus line and the negative bus line.

28. A resonant power converter comprising:
a positive bus line;
a negative bus line;
a power converting portion connected between a DC power source and a load for implementing power conversion, the power converting portion including
a plurality of main switching devices connected in series and provided between the positive bus line and the negative bus line, and
a plurality of flywheel diodes commented antiparallel with the main switching devices respectively for each phase;
a resonant circuit connected between the positive bus line and the negative bus line, and including a resonant capacitor and a resonant reactor connected in series with the resonant capacitor; and
control means for switching the main switching devices in accordance with a predetermined pattern to enable the power converting portion to implement power conversion;

wherein the control means turns on a first switching device which should turn on based on the gate signal command, the output signal of the gate signal circuit, among the main switching devices to start resonance to be implemented by the resonant capacitor and the resonant reactor, and the control means turns off a second switching device which should turn off based on the gate signal command, the output signal of the gate signal circuit, among the main switching devices; and wherein the control means comprises first means for detecting whether or not a voltage between the positive bus line and the negative bus line is negative, and second means for turning off the second switching device when the first means detects that the voltage between the positive bus line and the negative bus line is negative.

* * * * *

UNITED STATES PATENT AND TRADEMARK OFFICE
CERTIFICATE OF CORRECTION

PATENT NO.    : 6,091,615
DATED         : July 18, 2000
INVENTOR(S)   : Inoshita et al.

It is certified that error appears in the above-identified patent and that said Letters Patent is hereby corrected as shown below:

Title page,
Please change "[75] Inventors: Ryosuke Inoshita, Kusugai; Masahito Mizukoshi, Kagoya, both of Japan" to -- [75] Inventors: Ryosuke Inoshita, Kusugai; Masahito Mizukoshi, Nagoya both of Japan --
Please change "[30]      Foreign Application Priority Data
    Nov. 28, 1997   [JP] Japan          9-328992
    Oct. 19, 1998   [JP] Japan          10-297128 " to -- [30].       Foreign Application Priority Data
    Nov. 28, 1997   [JP] Japan          9-328992
    Oct. 19, 1998   [JP] Japan          10-297178 --

Signed and Sealed this

Fourteenth Day of May, 2002

Attest:

*Attesting Officer*

JAMES E. ROGAN
*Director of the United States Patent and Trademark Office*